United States Patent [19]

Immer et al.

[11] 3,917,578
[45] Nov. 4, 1975

[54] PROCESS FOR PRODUCING SOMATOSTATIN AND INTERMEDIATES

[75] Inventors: Hans U. Immer, Mount Royal;
Kazimir Sestanj, Pointe Claire;
Verner R. Nelson, Kirkland;
Manfred K. Götz, Hudson, all of Canada

[73] Assignee: Ayerst McKenna and Harrison Ltd., Montreal, Canada

[22] Filed: Dec. 10, 1973

[21] Appl. No.: 423,352

[52] U.S. Cl. .............................................. 260/112.5
[51] Int. Cl.² ...................... C07C 103/52; C07G 7/00
[58] Field of Search ................................ 260/112.5

[56] References Cited
OTHER PUBLICATIONS

Camble et al.: J. Chem. Soc. (C), 1969, 1911–1916.
Bretschneider et al.: Monatsh. Chem., 90, 799–813 (1959).
Schröder: Jus. Lieb. Ann. Chem., 679, 213 (1964).
Losse et al.: Jus. Lieb. Ann. Chem., 636, 140–141 (1960).
Hiskey et al.: J. Am. Chem. Soc., 89, 440 (1967).
McIntire: J. Am. Chem. Soc., 69, 1377–1380 (1947).
Rivier et al.: Chem. Abstr. 79:53765r (1973).
Sarantakis et al.: Biochem. Biophys. Res. Comm., 54, 234–238 (1973).
Brazeau et al.: Science, 179, 77–79 (1973).
Merrifield: Adv. In Enzymology, 32, 254–255 (1969).

*Primary Examiner*—Lewis Gotts
*Assistant Examiner*—Reginald J. Suyat

[57] ABSTRACT

A new process for preparing the tetradecapeptide somatostatin,

H-Ala-Gly-Cys-Lys-Asn-Phe-Phe-Trp-Lys-Thr-Phe-Thrcomprises the preparation of a first heptapeptide of formula

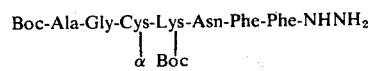

in which α is Acm or Trt and a second heptapeptide of formula

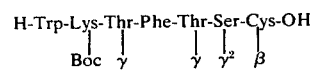

in which β is Acm or Trt and γ, γ¹ and γ² are either all hydrogen or all Bu⁺ from smaller peptides by a series of condensations involving the reaction of an appropriately protected peptide unit having an activated carboxylic ester with an appropriately protected peptide having a free amino group. Subsequently the first and second heptapeptides are condensed according to the axide method to obtain the linear tetradecapeptide of formula

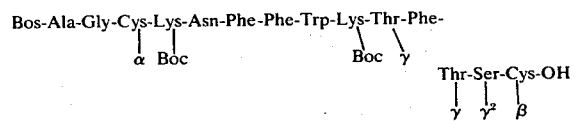

in which α, β, γ, γ¹ and γ² are as defined herein; thereafter the linear tetradecapeptide is transformed into the desired tetradecapeptide by deprotecting and oxidizing processes. In addition, the linear, reduced form of somatostatin is obtained by deprotection of the aforementioned linear tetradecapeptide or by reduction of somatostatin.

21 Claims, No Drawings

PROCESS FOR PRODUCING SOMATOSTATIN AND INTERMEDIATES

BACKGROUND OF THIS INVENTION a. Field of Invention

This invention relates to the tetradecapeptide, somatostatin. More particularly this invention concerns a process for making somatostatin and its linear, reduced form, and to intermediates used for this process.

b. Prior Art

The name "somatostatin" has been proposed for the factor found in hypothalamic extracts which inhibits the secretion of growth hormone (somatotropin). The structure of this factor has been elucidated by P. Brazeau, et al., Science, 179, 77(1973) and reported to be the following tetradecapeptide structure:

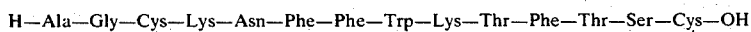

The abbreviations used herein for the various amino acids are Ala, alanine; Asn, asparagine; Cys, cysteine; Gly, glycine; Lys, lysine; Phe, phenylalanine; Ser, serine; Thr, threonine; and Trp, tryptophane.

The important physiological activity of this tetradecapeptide establishes it as a compound of significance for clinical pharmacology relating to the treatment of acromegaly and the management of juvenile diabetes; for example. see K. Lundbaek, et al., Lancet, 2, 131 (1970) and R. Guillemin in "Chemistry and Biology of Peptides", J. Meienhofer, Ed., 3rd American Peptide Symposium, Boston 1972, Ann Arbor Science Publications, Ann Arbor, Mich., 1972. However, as in the case of many naturally occurring compounds of animal origin the isolation and purification of this tetradecapeptide from natural sources is extremely laborious and expensive. Hence, there is a need for a practical synthesis of this tetradecapeptide that would provide this material for medical applications. To data attempts in this direction have included the synthesis of this material by solid-phase techniques; for example, see P. Brazeau, et al., cited above. However, such techniques are not readily adaptable to large scale preparations of molecules of the size of somatostatin. Furthermore, when this technique is applied to molecules of this size contamination by truncated and failure sequences occur with the net result that purification of the product is complicated substantially. Furthermore, solid-phase techniques require that the secondary functions, e.g., SH, NH₂ or OH, be protected by very stable groups which in the end must be removed under severe conditions, the latter conditions being detrimental to the somatostatin molecule.

In view of the inherent difficulties of solid-phase techniques it will be appreciated that a process for the synthesis of somatostatin based on the more classical methodology of organic chemistry would be more desirable and advantageous.

One such synthesis has been reported recently by D. Sarantakis and W. A. McKinley, Biochem. Biophys. Res. Comm., 54, 234 (1973). However, the report contains no reference to the practicability of the synthesis. In addition, it should be noted that the synthesis utilizes very stable protecting group which require severe conditions for their removal.

In keeping with the need for a practical synthesis of the tetradecapeptide somatostatin, the present invention discloses a new practical process for the large scale preparation of the tetradecapeptide. Furthermore the present process has additional advantages in that it starts from readily available materials, avoids noxious reagents, is executed facilely, utilizes easily removed protecting groups and provides a pure product having a high degree of physiological potency.

SUMMARY OF THE INVENTION

According to the process of this invention the tetradecapeptide, somatostatin, is obtained by coupling a first heptapeptide of formula

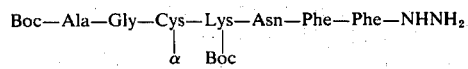

in which $\alpha$ is Acm or Trt and a second heptapeptide of formula

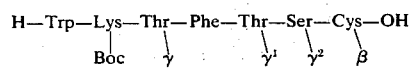

in which $\beta$ is Acm or Trt and $\gamma$, $\gamma^1$ and $\gamma^2$ are either all hydrogen or all Bu⁺ (i.e., when $\gamma$ is hydrogen then $\gamma^1$ and $\gamma^2$ must be hydrogen and when $\gamma$ is Bu⁺ then $\gamma^1$ and $\gamma^2$ must be Bu⁺) according to the azide coupling method to obtain the linear tetradecapeptide of formula

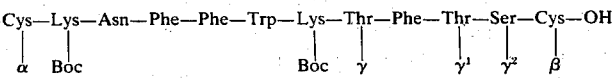

in which $\alpha$, $\beta$, $\gamma$, $\gamma^1$ and $\gamma^2$ are as defined herein; thereafter the linear tetradecapeptide is transformed into the tetradecapeptide, somatostatin, by deprotecting and oxidizing processes.

The first and second heptapeptides are elaborated from smaller peptides by a series of condensations involving the reaction of an appropriately protected peptide unit having an activated carboxylic ester with an appropriately protected peptide unit having a free amino group.

In one embodiment of this invention the aforementioned transformation into somatostatin is achieved by treating said linear tetradecapeptide with iodine, preferably in the presence of a lower alkanol, or thiocyanogen to obtain the corresponding cyclic disulfide derivative of formula

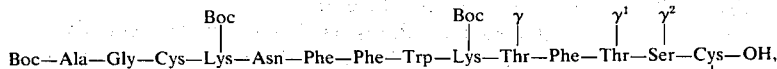

and subsequently removing all remaining protecting groups, namely the Boc and Bu⁺ groups, under moderately acidic conditions to obtain the desired tetradecapeptide, somatostatin.

In a second embodiment somatostatin is obtained by selectively removing said sulfhydryl protecting groups of said linear tetradecapeptide by the action of a mercuric or silver salt to obtain the corresponding disulfhydryl derivative in the form of its corresponding mercuric or disilver salt, subjecting the latter salt to the action of hydrogen sulfide to obtain the corresponding free disulfhydryl derivative; oxidizing the latter derivative with an oxidizing agent selected from the group consisting of iodine, oxygen, 1,2-diiodoethane and sodium or potassium ferricyanide to obtain the aforementioned corresponding cyclic disulfide derivative and finally removing said remaining protecting groups under moderately acidic conditions.

A further aspect of this invention comprises the removal of all the protecting groups from the aforementioned linear tetradecapeptide or the aforementioned disulfhydryl derivatives under moderately acidic conditions to obtain the linear, reduced form of somatostatin having the formula H-Ala-Gly-Cys-Lys-Asn-Phe-Phe-Trp-Lys-Thr-Phe-Thr-Ser-Cys-OH.

The latter compound is also obtained by direct reduction of somatostatin by agents known to be effective for reducing known cyclic disulfides to their corresponding disulfhydryl derivatives. If desired said reduced form of somatostatin is converted also to somatostatin by one of the above oxidizing agents.

DETAILS OF THE INVENTION

In general the abbreviations used herein for designating the amino acids and the protective groups are based on recommendations of the IUPAC-IUB Commission or Biochemical Nomenclature, see J. Biol. Chem., 241, 2491 (1966). For instance, Boc represents the amino protecting group, t-butyloxycarbonyl, Z represents benzyloxycarbonyl, Trt represents trityl, Np represents p-nitrophenyl, Tcp represents 2,4,5-trichlorophenyl, Bu⁺ represents t-butyl and Ddz represents α,α-dimethyl-3,5-dimethoxybenzyloxycarbonyl. The abbreviation "Acm" is used herein to designate the thio protecting group, acetamidomethyl. The abbreviation "Chb" is used herein to designate the amino protecting group, α-phenyl-5-chloro-2-hydroxybenzylidene, see A. Hope and B. Halpern, Tetrahedron Letters, 2261 (1972). The abbreviation "Me" is used herein to designate a methyl group.

The terms "peptide, polypeptide, tripeptide, hexapeptide, and the like" as used herein are not limited to refer to the respective parent peptides but are also used in reference to derivatives having functionalized or protecting groups.

All amino acids described herein are in the L-series.

The term "lower alkyl" as used herein contemplates hydrocarbon radicals having one to three carbon atoms and include methyl, ethyl and propyl.

The term "mineral acid" as used herein contemplates the strong inorganic acids and includes hydrochloric, hydrobromic, sulfuric, phosphoric and the like. When the term is used in conjunction with an anhydrous system, hydrogen chloride is the preferred mineral acid.

The term "mildly acid conditions" as used herein contemplates conditions in which a dilute aqueous solution of an organic acid, for example 30 to 90% aqueous formic, acetic or propionic acid, preferably 70 – 80%, or 1 to 10% aqueous trifluoroacetic acid, is a principal component of the reaction medium.

The term "moderately acidic conditions" as used herein comtemplates conditions in which concentrated organic acids or aqueous solutions of the mineral acids are used as a principal component of the reaction medium at temperatures ranging from about −30° to 30°C. Examples of preferred conditions in this case include the use of anhydrous trifluoroacetic acid at 0° to 30°C or 2 – 12N hydrochloric acid at −20° to 10°C.

The term "organic nitrite" includes the commercially available alkyl nitrites, for instance, t-butyl nitrite, isoamyl nitrite, and the like.

The term "organic base" as used herein includes triethylamine, N-ethylmorpholine, N-methylpiperidine, pyridine and the like.

The term "strong base" as used herein contemplates both organic bases, as described above, and strong inorganic bases including the hydroxides and carbonates of sodium and potassium.

The term "activated ester" as used herein contemplates carboxyl-activating groups employed in peptide chemistry to promote facile condensation of the peptide carboxyl group with a free amino group of another peptide Descriptions of these carboxyl-activating groups are found in general textbooks of peptide chemistry; for example, K. D. Kopple, "Peptides and Amino Acids", W. A. Benjamin, Inc., New York, 1966, pp. 50 – 51 and E. Schröder and K. Lübke, "The Peptides"; Vol. 1, Academic Press, New York, 1965, pp. 77 – 128. The following carboxyl-activating groups have proved to be particularly suitable in the process of this invention: 2,4,5-trichlorophenyl, pentachlorophenyl, p-nitrophenyl, succinimido and 1-benzotriazolyl.

The "azide method" as used herein refers to the method of coupling two peptide fragments which comprises the reaction of an amino acid hydrazide having a suitably protected amino group with an organic nitrite, usually t-butyl or isoamyl nitrite, to obtain the corresponding azide which is then reacted with an amino acid having a free amino and a suitably protected carboxylic acid group, to obtain the desired peptide.

Preferred conditions for the azide method of coupling comprise reacting the amino acid hydrazide with the organic nitrite in the presence of a mineral acid in an anhydrous inert organic solvent, for example, dimethyl formamide, ethyl acetate, methylene dichloride, tetrahydrofuran and the like, at −30° to 20°C, preferably −15°C, for 10 – 60 minutes to obtain the corresponding azide, rendering the resulting mixture alkaline by the addition of a strong base, preferably an organic base, for example triethylamine or N-ethylmorpholine, and thereafter reacting the azide in the mixture with the peptide unit having the free amino group at temperatures ranging from −30°C to 20°C for about 1 hour and then at 0° to 30°C for 10 to 24 hours. See also the above cited textbooks of Kopple and Schröber and Lübke for additional descriptions of this method.

The tetradecapeptide of this invention, somatostatin, and the linear, reduced form thereof are obtained in the form of an acid addition salt either directly from the process of this invention or by reacting the tetradecapeptide with one or more equivalents of the appropriate acid. Examples of salts are those with organic acids, e.g. acetic, lactic, succinic, benzoic, salicyclic, methanesulfonic or toluenesulfonic acid, as well as polymeric acids such as tannic acid or carboxymethyl cellulose, and salts with inorganic acids such as hydrohalic acids, e.g. hydrochloric acid, or sulfuric acid, or phosphoric acid. It should be noted that the tetradecapeptide and its linear, reduced form have three basic nitrogens giving rise to addition salts with one to three equivalents of acid. If desired a particular acid addition salt is converted into another acid addition salt, e.g., a salt with a pharmaceutically acceptable acid, by treatment with the appropriate ion exchange resin in the manner described by R. A. Boissonas et al., Helv. Chim Acta, 43, 1349 (1960). Suitable ion exchange resins are cellulose based cation exchangers, for example carboxymethylcellulose or chemically modified, cross-linked dextran cation exchangers, for example, Sephadex C type, and strongly basic anion exchange resins, for example those listed in J. P. Greenstein and M. Winitz "Chemistry of the Amino Acids", John Wiley and Sons, Inc., New York and London, 1961, Vol. 2, p. 1456.

The tetradecapeptide and its linear reduced form also form addition salts with suitable pharmaceutically acceptable inorganic and organic bases. In this case the cyclic or linear tetradecapeptide is transformed in excellent yield into the corresponding pharmaceutically acceptable salts by neutralization of the tetradecapeptide with the appropriate inorganic or organic base. Suitable inorganic bases to form these salts include, for example, the hydroxides, carbonates, bicarbonates or alkoxides of the alkali metals or alkaline earth metals, for example, sodium, potassium, magnesium, calcium and the like. Suitable organic bases include the following amines; lower mono-, di- and trialkyl-amines, the alkyl radicals of which contain up to three carbon atoms, such as methylamine, dimethylamine, trimethylamine, ethylamine, di- and triethylamine, methylethylamine, and the like; mono-, di- and trialkanolamines, the alkanol radicals of which contain up to three carbon atoms, such as mono-, di- and triethanolamine; alkylene-diamines which contain up to six carbon atoms, such as hexamethylenediamine; cyclic saturated or unsaturated bases containing up to six carbon atoms, such as pyrrolidine, piperidine, morpholine, piperazine and their N-alkyl and N-hydroxyalkyl derivatives, such as N-methyl-morpholine and N-(2-hydroxyethyl)- piperidine.

The tetradecapeptide and its linear, reduced form give complex salts with heavy metal ions. An example of a pharmaceutically acceptable heavy metal complex is a complex formed with zinc or with zinc protamine.

The tetradecapeptide and its linear reduced form produced by the process of this invention, as well as their corresponding pharmaceutically acceptable salts, are useful because they possess the pharmacological activity of the natural tetradecapeptide. Their activity is demonstrated readily in pharmacological tests such as a modification [A. V. Schally et al., Biochem. Biophys. Res. Commun., 52, 1314 (1973); R. Rivier et al.., C.R. Aca. Sci, Paris, Ser. D, 276, 2737 (1973)] of the method of M. Saffran and A. V. Schally, Can. J. Biochem. Physiol., 33, 405 (1955). For example, when the tetradecapeptide of this invention is tested for its effect on the release of growth hormone (GH) in vitro from isolated rat pituitaries according to this modification, the following results, expressed as percentage ratios of medium GH in the second hour to mediumm GH in the first hour, were obtained:

| Sample | Dose | % of Control + SE |
|---|---|---|
| Control | — | 119.9 ± 5.0 |
| Somatostatin* | 0.01 mcg/ml | 78.9 ± 5.9 ($p < 0.01$) |
| Somatostatin* | 0.1 mcg/ml | 64.5 ± 4.8 ($p < 0.01$) |

*Prepared according to the process of this invention.

The tetradecapeptide, its linear, reduced form or a salt thereof can be used for the treatment of acromegaly and other hypersecretory endocrine states and in the management of diabetics; see for example, P. Brazeau et al., cited above. When the tetradecapeptide, its linear, reduced form or a salt thereof is employed for such treatment or management, it is administered systemically, preferably parenterally, in combination with a pharmaceutically acceptable liquid or solid carrier. The proportion of the tetradecapeptide or a salt thereof is determined by its solubility in the given carrier, by the given carrier, by the chosen route of administration, and by standard biological practice. For parenteral administration to animals the tetradecapeptide, its linear, reduced form or a salt thereof is used in a sterile aqueous solution which may also contain other solutes such as buffers or preservatives, as well as sufficient pharmaceutically acceptable salts or glucose to make the solution isotonic. The dosage will vary with the form of administration and with the particular species of animal to be treated and is preferably kept at a level of from 5 mcg to 300 mcg per kilogram body weight. However, a dosage level in the range of from about 10 mcg to about 50 mcg per kilogram body weight is most desirably employed in order to achieve effective results.

The tetradecapeptide, its linear, reduced form or a salt thereof may also be administered in one of the long acting, slow-release or depot dosage forms described below, preferably by intramuscular injection or by implantation. Such dosage forms are designed to release from about 0.5 mcg to about 50 mcg per kilogram body weight per day.

It is often desirable to administer the agent continuously over prolonged periods of time in long-acting, slow-release, or depot dosage forms. Such dosage forms may either contain a pharmaceutically acceptable salt of the agent having a low degree of solubility in body fluids, for example one of those salts described below, or they may contain the agent in the form of a water-soluble salt together with a protective carrier which prevents rapid release. In the latter case, for example, the agent may be formulated with a non-antigenic partially hydrolyzed gelatin in the form of a viscous liquid; or the agent may be absorbed on a pharmaceutically acceptable solid carrier, for example, zinc hydroxide, and may be administered in suspension in a pharmaceutically acceptable liquid vehicle; or the agent may be formulated in gels or suspensions with a protective non-antigenic hydrocolloid, for example sodium carboxymethylcellulose, polyvinylpyrrolidone, sodium alginate, gelatine, polygalacturonic acids, for example, pectin, or certain mucopolysaccharides, together with aqueous or non-aqueous pharmaceutically acceptable liquid vehicles, preservatives, or surfactants. Examples of such formulations are found in standard pharmaceutical texts, e.g. in Remington's Pharmaceutical Sciences, 14th Ed., Mack Publishing Co., Easton, Pa., 1970. Long-acting, slow-release preparations of the agent produced according to the process of this invention may also be obtained by microencapsulation in a pharmaceutically acceptable coating, for example gelatine, polyvinyl alcohol or ethyl cellulose. Further examples of coating materials and of the processess used for microencapsulation are described by J.A. Herbit in "Encyclopedia of Chemical Technology", Vol. 13, 2nd Ed., Wiley, New York 1967, pp. 436 – 456. Such formulations, as well as suspensions of salts of the agent which are only sparingly soluble in body fluids, are designed to release from about 5.0 mcg to about 100 mcg of the active compound per kilogram body weight per day, and are preferably administered by intramuscular injection. Alternatively, some of the solid dosage forms listed above, for example certain sparingly water-soluble salts or dispersions in or adsorbates on solid carriers of salts of the agent, for example dispersions in a neutral hydrogel of a polymer of ethylene glycol methacrylate or similar monomers cross-linked as described in U.S. Pat. No. 3,551,556 may also be formulated in the form of pellets releasing about the same amounts as shown above and may be implanted subcutaneously or intramuscularly.

The process of this invention is illustrated by the accompanying flow diagram in which $\alpha$, $\beta$, $\gamma$, $\gamma^1$, and $\gamma^2$ are as defined herein and the following description of a preferred embodiment:

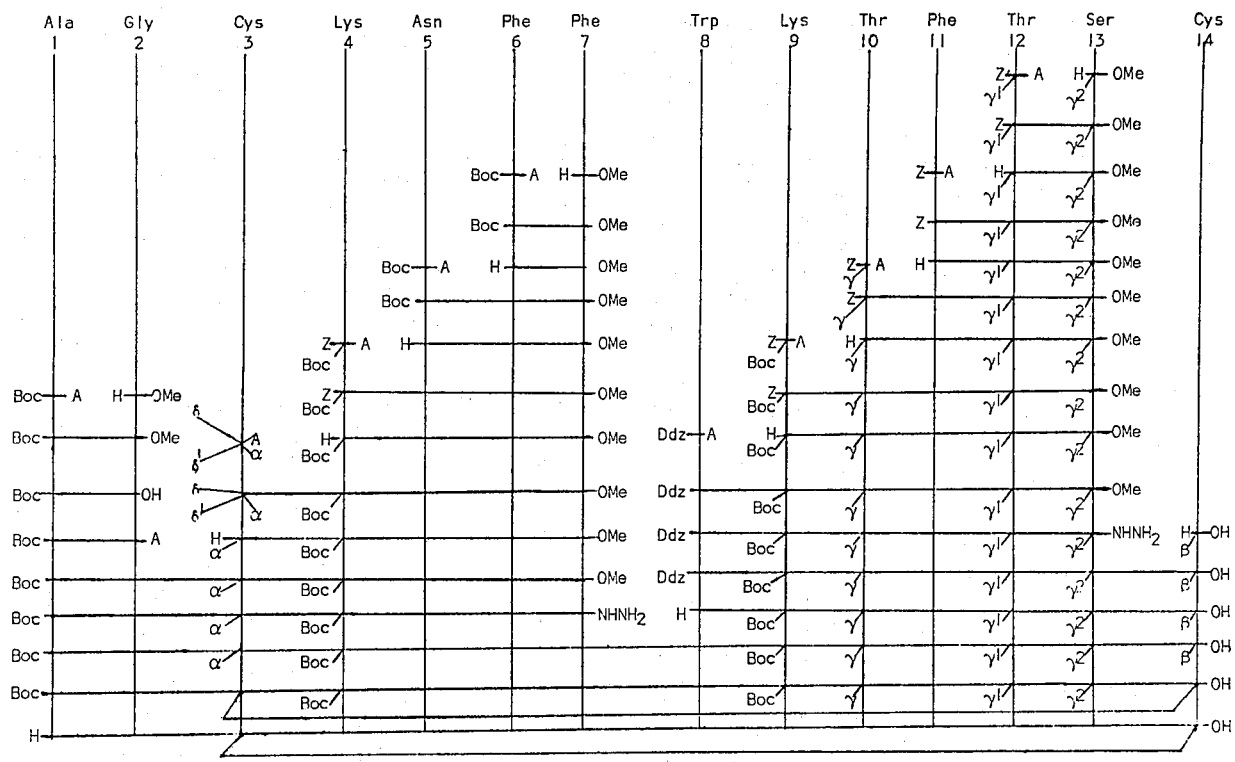

A = O-(carboxyl-activating group)

Process

For convenience and clarity in the following discussion the individual peptide unit (i.e., amino acid) is sometimes designated by a number which has reference to the position in which the particular amino acid appears in the sequence of the amino acid as illustrated in formula 1.

First Heptapeptide

First, with reference to the first heptapeptide (fragment 1–7) a practical and convenient preparation is realized by preparing a dipeptide (fragment 1–2) and a pentapeptide (fragment 3–7) and subsequently coupling the latter two fragments.

More specifically, the fragment 1–2 is prepared by reacting an activated ester of Boc-Ala-OH with a lower alkyl ester of glycine, preferably H-Gly-OMe, to obtain the corresponding lower alkyl ester of Boc-Ala-Gly-OH which in turn is hydrolyzed to afford its corresponding acid, Boc-Ala-Gly-OH. The latter dipeptide acid is then converted to a corresponding activated ester (fragment 1-2) for subsequent coupling with the fragment 3-7.

In a preferred embodiment the dipeptide fragment 1-2 is prepared by reacting t-butoxycarbonylalanine [Boc-Ala-OH, described by G. W. Anderson and A. C. McGregor, J. Amer. Chem. Soc., 79, 6180 (1957)] with substantially one molar equivalent of 1-hydroxybenzotriazole in an inert organic solvent, preferably dimethylformamidie (DMF) or tetrahydrofuran (THF) in the presence of dicyclohexylcarbodiimide (DCC, 1 to 1.6 molar equivalents) at −20° to 10°C, preferably 0°C, for about 1 hour, then at 20° to 30°C for about 1 hour. In this manner the corresponding activated ester, i.e. the 1-benzotriazolyl ester of Boc-Ala-OH, is obtained. The latter compound is then condensed with about one molar equivalent of glycine methyl ester hydrochloride in the presence of 1 to 1.5 molar equivalents of an organic base in an inert organic solvent, preferably DMF, at 20° to 30°C for 10 to 24 hours to obtain Boc-Ala-Gly-OMe. The latter compound is now subjected to hydrolyzing conditions to obtain the corresponding acid Boc-Ala-Gly-OH. Preferred hydrolyzing conditions involve subjecting Boc-Ala-Gly-OMe to the action of a base, for example an excess of sodium or potassium hydroxide, in the presence of sufficient water to effect hydrolysis of the ester. The hydrolysis is performed in an organic inert solvent, for example, methanol, ethanol or methoxyethanol. Under these conditions hydrolysis is usually completed within 1 or 2 hours at temperatures of 0° to 50°C, preferably 20° to 30°C. Thereafter, Boc-Ala-Gly-OH is converted to the corresponding activated ester Boc-Ala-Gly-OTcp (i.e. the desired dipeptide fragment 1-2) by condensing substantially equimolar amounts of the latter acid and 2,4,5-trichlorophenol, in the presence of 1.0 to 1.25 molar equivalents of DCC in an inert organic solvent, for example ethyl acetate or THF, at −20° to 20°C for 2 to 4 hours and then at 0° to 20°C for 10 to 24 hours.

With reference to the pentapeptide fragment 3-7, the pentapeptide is prepared by reacting an activated ester of Boc-Phe-OH with a lower alkyl ester of phenylalanine, preferably H-Phe-OMe, to obtain the lower alkyl ester of the dipeptide, Boc-Phe-Phe-OH, which after removal of the terminal protecting group (Boc) under moderately acidic conditions gives the lower alkyl ester of phenylalanylphenylalanine, preferably H-Phe-Phe-OMe. In turn the latter compound is reacted with an activated ester of Boc-Asn-OH to obtain the corresponding lower alkyl ester of Boc-Asn-Phe-Phe-OH, preferably Boc-Asn-Phe-Phe-OMe. Subsequent removal of the terminal amino protecting group of the latter compound under moderately acidic conditions gives the corresponding lower alkyl ester of asparaginylphenylalanylphenylalanine, preferably H-Asn-Phe-Phe-OMe, (i.e. a tripeptide having peptide units 5-7).

Thereafter the tripeptide is used to give the desired pentapeptide fragment 3-7 by reacting the latter tripeptide with an activated ester of

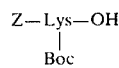

to obtain the corresponding lower alkyl ester of

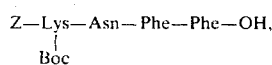

preferably

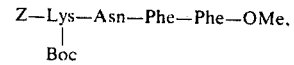

hydrogenating the lastnamed compound in the presence of a noble metal catalyst to obtain a lower alkyl ester of

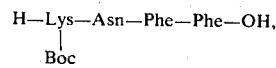

preferably

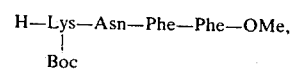

condensing the last-named compound with an activated ester of

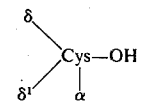

in which α is Acm or Trt and δ is hydrogen and δ¹ is Trt or δ and δ¹ together are Chb= to obtain a lower alkyl ester of

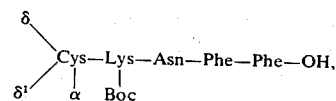

preferably

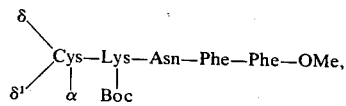

in which α, δ and δ¹ are as defined herein and removing the terminal N- protecting group (Trt or Chb=) of said last-named compound under mildly acidic conditions to give the desired pentapeptide fragment 3-7.

In a preferred embodiment of the preparation of the above pentapeptide fragment 3-7, the starting material Boc-Phe-OH, described by G. R. Pettit, et al., Can. J. Chem., 45, 1561 (1967), is converted to its corresponding activated 1-benzotriazolyl ester by treating said starting material with substantially one molar equivalent of 1-hydroxybenzotriazole in an inert organic solvent, preferably DMF or THF in the presence of DCC (1.0 to 1.3 molar equivalents) at −20° to 10°C, preferably 0°C from 30 minutes to four hours and then at 20° to 30°C for an additional hour.

The activated ester, i.e. the 1-benzotriazolyl ester of Boc-Phe-OH, is then condensed with phenylalanine methyl ester hydrochloride (1.0 to 1.2 molar equivalents) in the presence of 1 to 1.5 molar equivalents of an organic base in an inert organic solvent, preferably DMF at 0° to 30°C for 10 to 24 hours to obtain Boc-Phe-Phe-OMe.

In a modification of the previous procedure the activated ester is formed in the reaction mixture as described above; however, the formation is carried out in the presence of the appropriate amino acid derivative, for example, phenylalanine methyl ester in the present case; whereby the activated ester condenses immediately with said terminal amino peptide group of said amino acid derivative to give the desired coupling product.

Thereafter Boc-Phe-Phe-OMe is dissolved in concentrated trifluoroacetic acid and the solution is kept at 0° to 10°C for about one hour followed by evaporation of the trifluoroacetic acid to give H-Phe-Phe-OMe in the form of its acid addition salt with trifluoroacetic acid. Although the latter salt can be converted to its corresponding free peptide by standard means, it is expedient to add the salt directly to the following condensation reaction mixture with a concomitant amount of an organic base to compensate for the trifluoroacetic acid portion of the salt. Likewise, the latter consideration applies if a saturated solution of hydrogen chloride is used for the deprotecting reaction. Indeed this latter consideration applies to all the deprotecting reactions of the present disclosure involving the removal of the protecting groups under moderately or mildly acidic conditions.

In the subsequent condensation reaction H-Phe-Phe-OMe in the form of its trifluoroacetic acid addition salt is dissolved in DMF and the resulting solution cooled to about 0° to 10°C. An excess, preferably 1.1 to 1.3 molar equivalents of N-ethylmorpholine is added to the solution; the solution now has a pH of about 8. Substantially one equivalent of t-butoxycarbonylasparagine-2,4,5-trichlorophenyl ester, described by J. Pless and R. A. Boissonnas, Helv. Chim. Acta. 46, 1609 (1963), is added and the reaction mixture is kept at 0°C for three to four days affording Boc-Asn-Phe-Phe-OMe which on treatment with trifluoroacetic acid in the aforementioned manner yields the tripeptide, H-Asn-Phe-Phe-OMe, having peptide units 5 – 7, the tripeptide being in the form of its trifluoroacetic acid addition salt.

Further transformation of the tripeptide is effected by dissolving the latter trifluoroacetic acid addition salt in DMF. At about 0°C the solution is treated with an excess, preferably 1.1 to 1.3 molar equivalents, of N-ethylmorpholine. In this manner the pH of the mixture is kept between pH 7-8, preferably about pH 8. The latter solution is treated now with 1 to 1.2 molar equivalents of N α -benzyloxycarbonyl-N ε -tbutyloxycarbonyllysine p-nitrophenyl ester,

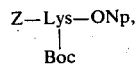

described by E. Sandrin and R. A. Boissonnas, Helv. Chim. Acta, 46,1637 (1963), and the resulting mixture is kept at 0°C for several days, preferably about two days. Thereafter evaporation of the solvent and recrystallization from methanol gives

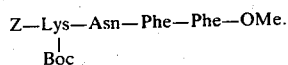

Hydrogenation of the latter compound in the presence of a noble metal catalyst readily yields

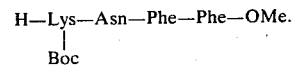

Preferred noble metal catalyst for effecting the above and other hydrogenations in the process of this invention include those of palladium and platinum, for example, 5% Pd-C, or 5% Pt-C; the hydrogenation itself being performed in an inert organic solvent, for example, acetic acid, methanol, ethyl acetate and the like.

In the present instance the hydrogenation is preferably carried out with 5% Pd-C in acetic acid whereby the hydrogenation product,

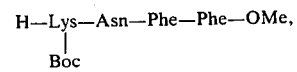

is obtained in the form of its acetic acid addition salt by separating the catalyst from the reaction mixture and evaporating the solvent.

For the next step the activated ester of formula

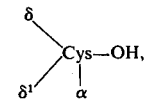

N-(α-phenyl-5-chloro-2-hydroxybenzylidene)-S-acetamidomethylcysteine, is prepared as follows:

Equimolar amounts of S-acetamidomethylcysteine, described by D. F. Veber et al., J. Amer. Chem. Soc. 94, 5456 (1972), and 5-chloro-2-hydroxy-benzophenone are dissolved in a solution of tetramethylammonium hydroxide in methanol and the mixture is stirred for 24 hours at room temperature. Thereafter the mixture is filtered and evaporated. The residue is triturated with ice-water and the solid unreacted benzophenone removed by filtration. The filtrate is rendered acidic with citric acid. The mixture is extracted with ethyl acetate. The extract is washed with water and dried. An equimolar amount of dicyclohexylamine in ethyl acetate is added and crystalline N-(α-phenyl-5-chloro-2-hydroxy-benzylidene)-S-acetamidomethylcysteine is obtained in the form of its addition salt with dicyclohexylamine. The salt is suspended in water. The aqueous solution is rendered acidic with citric acid (ph 4) and extracted with ethyl acetate. The extract is washed with water and dried over anhydrous magnesium sulfate at 0° to 10°C. The solvent is evaporated to give N-(α-phenyl-5-chloro-2-hydroxybenzylidene)-S-acetamidomethylcysteine

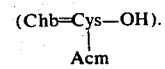

The latter acid is converted thereafter to the corresponding 1-benzotriazolyl activated ester in the same manner as described hereinbefore for other such activated esters.

It should be kept in mind that other suitable acids of formula

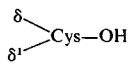

can be used at this point of the process instead of N-(α-phenyl-5-chloro-2-hydroxybenzylidene)-S-acetamidomethylcysteine. Other such acids include the corresponding S-trityl derivative of the last-named acid, N-trityl-S-acetamidomethylcysteine and N,S-ditritylcysteine.

In the next step the latter activated ester of

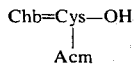

is now condensed with substantially one molar equivalent of

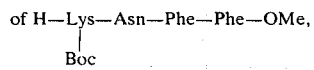

described above, in an inert organic solvent, for example DMF, to obtain

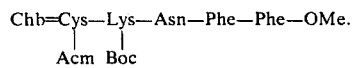

The condensation is preferably carried out by employing

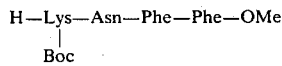

in the form of its acetic acid addition salt in the presence of a sufficient amount of an organic base, for instance, N-ethylmorpholine, to keep the pH of the condensation mixture between pH 7 and pH 8. Preferably the N-ethylmorpholine is added to the mixture of the activated ester and the acetate salt in DMF solution at 0° to 10°C, and then the mixture is stirred at 20° to 30°C for 10 to 24 hours.

Thereafter the terminal amino protecting group of the condensate

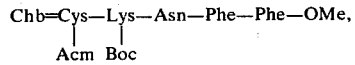

is removed to obtain the desired pentapeptide fragment 3-7 of formula

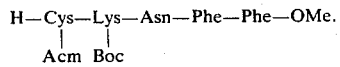

The removal of this protecting group is readily accomplished under mildly acidic conditions. Preferred conditions include dissolving the condensate in 70 to 80% acetic acid and allowing the solution to stand at 20° to 45°C for 2 to 24 hours. Concentration of the solution affords the pentapeptide

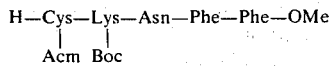

in the form of its acetic acid addition salt. At this point of the preferred process the aforementioned activated ester, Boc-Ala-Gly-OTcp (dipeptide fragment 1–2 ) is condensed with the preceding pentapeptide

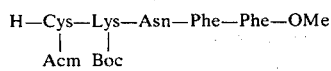

(pentapeptide fragment 3–7) to obtain

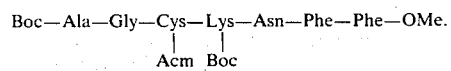

Preferred conditions for this present condensation include dissolving the acetic acid addition salt of said pentapeptide in an inert organic solvent, preferably DMF, and adding a sufficient amount of an organic base, preferably N-ethylmorpholine, at 0° to 10°C to keep the pH of the mixture between pH 7 and pH 8. About 1.0 to 1.25 molar equivalent of Boc-Ala-Gly-OTcp in the inert organic solvent is then added to the latter solution and the resulting mixture is kept at 0° to 10°C for one to three days. Subsequently the heptapeptide ester,

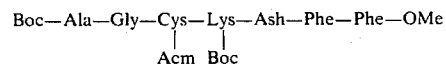

is isolated from the reaction mixture.

The latter compound is readily transformed to the corresponding first heptapeptide of this invention by reaction with an excess (20 to 50 molar equivalents) of hydrazine hydrate. Preferred conditions include treating said latter compound in an inert organic solvent, for example methanol or dimethylsulfoxide, with 30 to 40 molar equivalents of hydrazine hydrate at 0° to 10°C for about one-half to 1 hour, then keeping the solution at 20° to 30°C for 6 hours to 4 or 5 days. Subsequent addition of water to the reaction mixture gives the desired first heptapeptide of formula

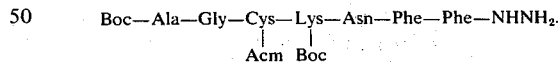

Alternatively the desired first heptapeptide is obtained in a like manner by the preceding process when, as noted above, N-(α-phenyl-5-chloro-2-hydroxybenzylidine)-S-acetamidomethylcysteine is replaced with a suitable acid of formula

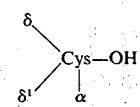

in which α is trityl. A preferred embodiment of the latter case involves such replacement with N,S-ditritylcysteine, described by G. Amiard et al., Bull. Soc. Chim. Fr., 698 (1956).

More specifically, in an alternative specific embodiment the corresponding 1-benzotriazolyl activated ester of N,S-ditritylcysteine, prepared in the same manner as described hereinbefore for other such activated esters, is condensed with the aforementioned acetic acid addition salt of

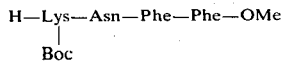

to obtain the pentapeptide,

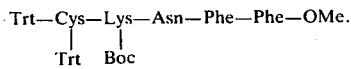

Conditions preferred for this condensation are the same as those described previously for the similar condensation of this acetic acid salt with the activated ester of

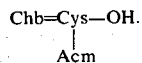

Treatment of the latter pentapeptide under mildly acidic conditions, described above, using 70 – 80% acetic acid, readily gives the corresponding pentapeptide,

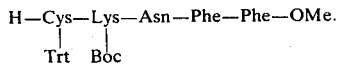

The latter compound is then condensed with the activated ester Boc-Ala-Gly-OTcp, in the same manner described previously for the condensation of

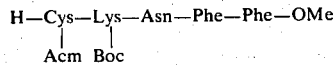

with the same activated ester (i.e. dipeptide fragment 1–2), to obtain

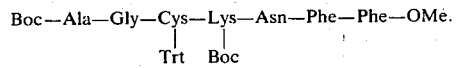

Subsequent reaction of the last-said compound with hydrazine hydrate under the same conditions of the previous reaction with hydrazine hydrate affords the desired first heptapeptide of formula

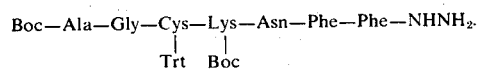

Second Heptaptide

A practical and convenient preparation is realized for the second heptapeptide (fragment 8–14) by preparing a hexapeptide having a protected terminal amino group (fragment 8–13), coupling the latter with S-acetamidomethylcysteine

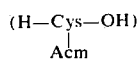

or S-tritylcysteine

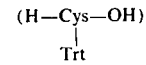

and removing the terminal amino protecting group.

More specifically, the hexapeptide is prepared by reacting a lower alkyl ester of the serine derivative of formula

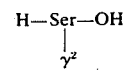

in which $\gamma^2$ is hydrogen or $Bu^+$, preferably serine methyl ester (H-Ser-OMe), or 0-t-butylserine methyl ester

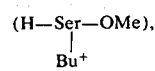

with an activated ester of benzyloxycarbonyl threonine (Z-Thr-OH) or benzyloxycarbonyl-(0-t-butyl)threonine

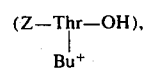

respectively, to obtain the corresponding lower alkyl ester of the dipeptide of formula

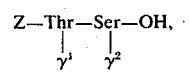

preferably

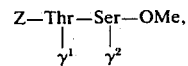

$\gamma^1$ and $\gamma^2$ being both hydrogen or both $Bu^+$, respectively. The terminal amino protecting group (Z) of the latter compound is then removed by hydrogenation in the presence of a noble metal catalyst to afford the corresponding lower alkyl ester of the dipeptide of formula

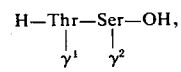

preferably

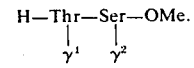

The latter dipeptide lower alkyl ester, preferably the methyl ester, is then reacted with an activated ester of Z-Phe-OH to obtain the corresponding lower alkyl ester of formula

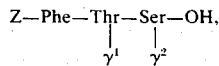

preferably

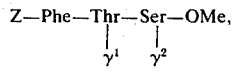

in which γ and γ¹ are as defined herein, from which the terminal amino group (Z) is removed subsequently by hydrogenation in the presence of a noble metal catalyst to give the corresponding tripeptide lower alkyl ester of

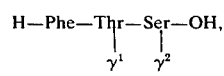

preferably

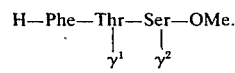

Next the latter tripeptide ester, preferably the methyl ester, is reacted with an activated ester of

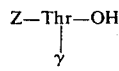

in which γ is hydrogen when γ¹ and γ² of the aforementioned tripeptide are both hydrogen or γ is Bu⁺ when γ¹ and γ² of the aforementioned tripeptide are both Bu⁺ to obtain the corresponding tetrapeptide lower alkyl ester of

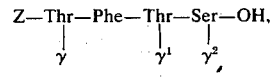

preferably

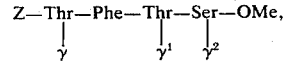

in which γ, γ¹, and γ² are as defined herein. Again the terminal amino protecting group (Z) of the last-named compound is removed by hydrogenation in the presence of a noble metal catalyst to give the corresponding tetrapeptide lower alkyl ester of

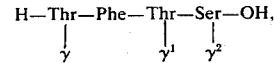

preferably

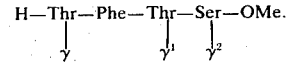

Thereafter, the latter compound is reacted with an activated ester of

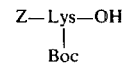

to obtain the lower alkyl ester of

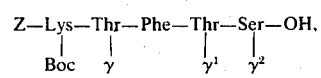

preferably

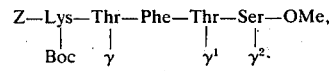

in which γ, γ¹, and γ² are as defined herein, followed by removal of the terminal amino protecting group (Z) of the last-named compound by hydrogenation in the presence of a noble metal catalyst to give the corresponding pentapeptide lower alkyl ester of

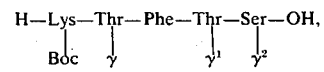

preferably

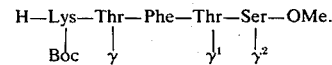

The latter compound is now reacted with an activated ester of Ddz-Trp-OH to obtain the corresponding lower alkyl ester of

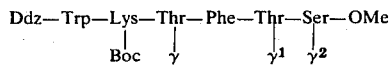

in which γ, γ¹ and γ² are as defined herein which in turn is reacted with hydrazine hydrate whereby the corresponding hexapeptide hydrazide,

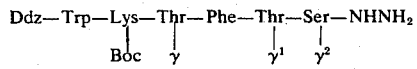

in which γ, γ¹ and γ² are as defined herein, is isolated. This latter hydrazide is the hexapeptide fragment 8–13 referred to hereinbefore.

The preceding hexapeptide (fragment (8–13) is now coupled with

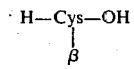

in which β is Acm or Trt according to the azide coupling method to give the corresponding heptapeptide,

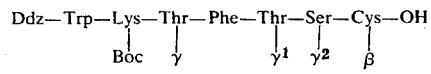

in which γ, γ¹ and γ² are as defined herein. Treatment of the latter compound under mildly acidic conditions affords the desired second heptapeptide of this invention.

In a preferred embodiment the second heptapeptide is prepared in the following manner.

The preferred first starting material is either serine methyl ester or its corresponding hydroxy protected derivative, 0-t-butylserine methyl ester, described by E. Schröder, Justus Liebigs' Ann. Chem. 670, 127 (1963).

The preferred second starting material is either one of the following activated esters, benzyloxycarbonylthreonine pentachlorophenyl ester, prepared from pentachlorophenol and benzloxycarbonylthreonine, described by E. Wünsch and J. Jentsch, Chem. Ber., 97, 2490 (1964) or benzyloxycarbonyl-(0-t-butyl)threonine 1-benzotriazolyl ester, prepared in the manner described previously for such esters from benzyloxycarbonyl-(0-t-butyl)threonine, described by E. Schröder, cited above.

With reference to the first step of the present embodiment serine methyl ester or its corresponding hydroxy protected derivative is condensed with one of the preceding active esters to give the corresponding dipeptide derivative of formula

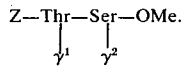

Preferably if serine methyl ester (H-Ser-OMe) is used as the first starting material, it is condensed with benzoyloxycarbonylthreonine pentachlorophenyl ester; and if 0-t-butylserine methyl ester is used as the first starting material, it is condensed with benzyloxycarbonyl-(0-t-butyl)threonine. The present condensation of the activated esters is carried out using 1.0 to 1.2 molar equivalents of the activated ester with respect to the first starting material. It is to be understood that acid addition salts of the first starting materials, i.e. the peptide having a free amino group, for example, serine methyl ester hydrochloride, are equally efficacious starting materials for such reactions provided that an approximately equimolar amount of an organic base is added to the reaction mixture. DMF and THF are convenient inert organic solvents for this reaction. The condensation reaction is initiated at temperatures of 0° to 10°C for one-half to 3 hours then kept at 20° to 30°C for 10 to 24 hours.

The dipeptide derivative of formula

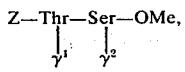

obtained as described above, is then subjected to hydrogenation in the presence of 5% palladium on charcoal (5% Pd/C) and an equimolar amount of pyridine hydrochloride or an excess of acetic acid. Methanol, ethanol, acetic acid, or mixtures thereof are convenient solvents for this hydrogenation. In this manner the terminal amino protecting group (Z) of the dipeptide is removed giving the corresponding dipeptide of formula

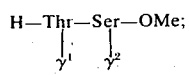

namely, threonylserine methyl ester or (0-t-butyl)-threonyl-(0-t-butyl)serine methyl ester.

Thereafter, by thrice repeating the last two steps (i.e. the coupling of an appropriate activated ester of an amino acid in which the terminal amino is protected by a benzyloxycarbonyl radical with the appropriate peptide having a free terminal amino group, followed by removal of the terminal amino protecting group by hydrogenation the preceding dipeptide derivatives of formula

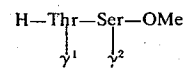

are converted to their corresponding pentapeptides of formula

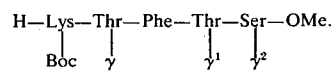

In the instance where

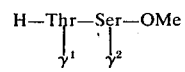

in which $\gamma^1$ and $\gamma^2$ are hydrogen is converted thus to its corresponding pentapeptide of formula

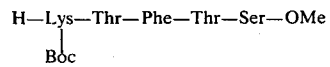

the preferred activated esters in order of use are benzyloxycarbonylphenylalanine 2,4,5-trichlorophenyl ester, described by J. Pless and R. A. Boissonnas, Helv. Chem. Acta, 46 1609 (1963); benzyloxycarbonylthreonine pentachlorophenyl ester described above, and benzyloxycarbonyl-N$^\epsilon$-t-butoxycarbonyllysine p-nitrophenyl ester, described by E. Sandrin and R. A. Boissonnas, Helv. Chem. Acta, 46, 1637 (1963). In the instance where

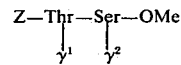

in which $\gamma^1$ and $\gamma^2$ are both Bu$^+$ is converted thus to its corresponding pentapeptide of formula

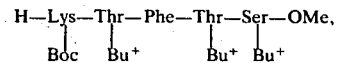

the preferred activated esters in order of use are benzyloxycarbonylphenylalanine 2,4,5-trichlorophenyl ester, benzyloxycarbonyl-(0-t-butyl)treonine 1-benzotriazolyl ester, and N$^\alpha$-benzyloxycarbonyl-N$^\epsilon$-t-butoxycarbonyllysine p-nitrophenyl ester, all noted previously.

The pentapeptides thus obtained are converted to their corresponding hexapeptide fragments 8–13 in the following manner:

The preceding pentapeptide of general formula

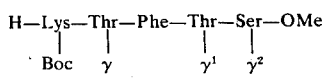

is condensed with the activated 1-benzotriazolyl ester of α, α-dimethyl-3,5-dimethoxybenzylcarbonyl tryptophane to give the corresponding condensate,

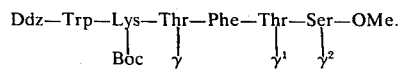

The latter activated ester is prepared from its corresponding acid Ddz-Trp-OH according to the previously described method for preparing such esters, Ddz-Trp-OH being described previously E. Birr, et al., Justice Liebigs' Ann. Chem., 763, 162 (1972). Again this instant condensation is accomplished readily and efficiently according to the conditions outlined above for the condensation of other 1-benzotriazolyl esters.

The latter condensate is reacted with hydrazine hydrate to obtain the corresponding hexapeptide hydrazide of formula Ddz—Trp—Lys—Thr—Phe—Thr—Ser—NHNH₂,
           Boc  γ         γ¹ γ² in which γ, γ¹ and γ² are as defined herein. This particular reaction proceeds smoothly and readily when performed in an inert solvent, for example, methanol, ethanol, DMF and the like, with an excess of hydrazine hydrate, for example 20 to 50 molar equivalents. Times and temperatures are not particularly critical for this reaction. Conditions which are both practical and convenient for this reaction include a reaction time of 6 hours to three days and a reaction temperature of −10° to 30°C, preferably 0° − 20°C.

Thereafter the above hexapeptide hydrazide, the hexapeptide fragment 8-13, is then coupled with

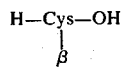

in which β is Acm or Trt according to the azide coupling method, described previously, to give the corresponding heptapeptide,

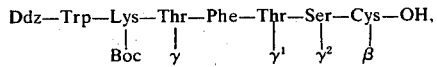

which on treatment under mildly acidic conditions, preferably by allowing the last said compound to stand in a solution of acetic acid-formic acid-water (7:1:2) for 16 to 24 hours, gives the desired second heptapeptide.

Formation of the linear tetradecapeptide

In the next step of the process of this invention the first heptapeptide (fragment 1 − 7) and the second heptapeptide (fragment 8 − 14) are coupled according to the azide coupling method to obtain the corresponding linear tetrapeptide of formula

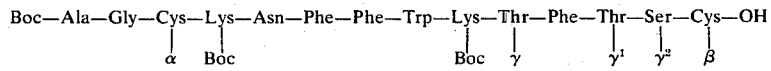

in which α, β, γ, γ¹ and γ² are as defined herein.

A convenient and efficacious procedure for this step comprises dissolving the first heptapeptide hydrazide in DMF. A solution of about two to five molar equivalents preferably three molar equivalents, of hydrogen chloride in ethyl acetate is added to the latter solution at −20° to 0°C, preferably −15° to 0°C. The mixture is cooled to −20° to −10°C, preferably −15°C, and t-butyl nitrite (1.0 to 1.5 molar equivalents, preferably 1.4 equivalents) is added to the stirred solution. After about 15 minutes at −20° to 10°C the mixture is rendered alkaline by the addition of an excess of an organic base, preferably 2 to 5 equivalents of triethylamine, followed by the addition of substantially one equivalent of the second heptapeptide. A further addition of one to two equivalents of organic base can be made at this point. The reaction mixture is then stirred at −10°C to 0°C for 10 to 24 hours. Evaporation of the solvent, trituration of the residue with water, methanol or a mixture of methanol and aqueous citric acid (2 to 5%) and separation of the solid gives the aforementioned linear tetradecapeptide which can be used without further purification for the subsequent step.

Somatostatin

The conversion of the preceding linear tetradecapeptide to somatostatin is accomplished conveniently and efficiently by first subjecting the linear tetradecapeptide to the action of iodine, preferably in the presence of a lower alkanol, whereby concomitant removal of the sulfhydryl protecting groups, i.e. the α and β groups in which α and β are Acm or Trt, and formation of the disulfide bridge occurs to give the corresponding cyclic disulfide derivative of formula

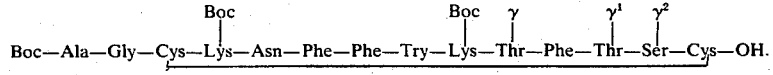

Subsequent treatment of the latter compound under moderately acidic conditions removes the remaining protecting groups (i.e. Boc and Bu⁺ when γ, γ¹ and γ² are Bu⁺) to give somatostatin.

In a preferred embodiment of the above transformation the linear tetradecapeptide is dissolved in methanol, ethanol or other suitable lower alkanol, for example, propanol, isopropanol and butanol. To this solution is added an excess of iodine (5 to 25, preferably 10 molar equivalents) dissolved in the same solvent, preferably 2 − 5% iodine in methanol. The time and temperature of this reaction is not critical; however, it is desirable to keep the reaction between 0° and 30°C by regulating the addition of the iodine solution or by cooling of the reaction mixture, or by a combination of both. Under these conditions the addition usually takes 30 to 60 minutes. After the addition the mixture is stirred at 20° to 30°C for 30 to 120 minutes, preferably 60 minutes. Thereafter the mixture is cooled to about 0°C and an excess of a mild reducing agent, preferably sodium thiosulfate in aqueous solution is added. The mixture is concentrated and the residue is suspended in water. Collection of the solid material affords the desired corresponding cyclic disulfide derivative.

Alternatively, the linear tetradecapeptide can be converted to the aforementioned corresponding cyclic disulfide derivative by the method of R. G. Hiskey and R. L. Smith, J. Amer. Chem. Soc., 90, 2677 (1968) using thiocyanogen.

Again alternatively, the latter derivative is also obtained by selectively removing the sulfhydryl protecting groups of the above linear tetradecapeptide by the action of the mercuric or silver salt, for example, mercuric acetate, mercuric chloride, silver acetate or silver nitrate, in an inert organic solvent, for example DMF or acetic acid, according to known methods; for example, see B. Kamber, and N. Rittel, Helv. Chem. Acta, 52, 1074 (1964), L. Zervas, et al., J. Amer. Chem. Soc. 87, 4922 (1965) and R. G. Denkewalter et al., J. Amer. Chem. Soc., 91, 502 (1969). The corresponding mercuric or disilver salt is then converted by hydrogen sulfide treatment to the corresponding free disulfhydryl derivative, see L. Zervas et al., cited above. The latter derivative is then converted to the aforementioned cyclic disulfide derivative by a mild oxidizing agent selected from the group consisting of iodine-according to the method described hereinbefore, oxygen-according to the method of J. Rivier et al., C. R. Acad. Sci. Ser. D, 276, 2737 (1973), 1,2-diiodoethane- according to the method of F. Weygand and G. Zumach, Z. Naturforsch. 17 b. 807 (1962), and sodium or potassium ferricyanide-according to the method of D. Jarvis et al., J. Amer. Chem. Soc., 83, 4780 (1961).

Finally, the aforementioned cyclic disulfide derivative is transformed into somatostatin by subjecting the former to moderately acidic conditions whereby the remaining protection groups of the cyclic disulfide derivative are removed. Generally this step is carried out by dissolving the cyclic disulfide derivative in an aqueous reaction medium containing a mineral acid at 0° to 20°C for 10 to about 60 minutes. Examples of such mediums are trifluoroacetic acid, 10 to 20% aqueous sulfuric acid, 10% phophoric acid, 10 – 30% hydrobromic acid and 10 to 30% hydrochloric acid. An extremely useful medium is concentrated hydrochloric acid. Preferred conditions for the present step include dissolving the cyclic disulfide in a minimum of concentrated hydrochloric acid cooled to 0°C and allowing the mixture to stand at 0°C for 5 to 10 minutes under a nitrogen atmosphere. Thereafter glacial acetic acid (10 X vols.) is added and the solution is cooled to about −70°C and lyophilized to give somatostatin. The latter product is purified further by ion exchange chromatography, preferably using a carboxymethylcellulose cation exchanger and ammonium acetate as the eluant. In this case the product is obtained in the form of its acid addition salt with acetic acid. Alternatively, the product is purified by partition chromatography on a chemically modified cross-linked dextran; for example, Sephadex LH-20 or Sephadex G-25 using methanol or acetic acid, respectively, as the eluting solvent. In the case where Sephadex LH-20 is employed, the product is obtained as the free peptide. In the case where Sephadex G-25 and acetic acid is employed, the product is obtained in the form of its acetic acid addition salt. Evaporation of the eluates, taking up the residue in water and lyophilizing yields the substantially pure tetradecapeptide of this invention, the cyclic disulfide of alanylglycylcysteinyllysylasparaginylphenylalanyl-phenylalanyltryptophyllysylthreonylphenylalanyl-threonylserylcysteine.

Linear Reduced Form

The linear reduced form of somatostatin is obtained by removal of the protecting groups from the aforementioned linear tetradecapeptide of formula

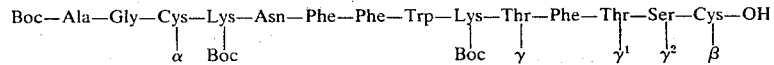

in which $\alpha$, $\beta$, $\gamma$, $\gamma^1$, $\gamma^2$ are as defined herein or the aforementioned disulfhydryl derivative of formula

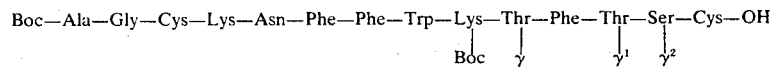

in which $\gamma$, $\gamma^1$ and $\gamma^2$ are as defined herein under moderately acidic conditions. Preferred conditions for this deprotection step comprise dissolving the linear tetradecapeptide in concentrated hydrochloric acid at 0° to 5°C in an inert atmosphere, for example, nitrogen or argon. The mixture is kept at this temperature for 5 to 10 minutes. Subsequent isolation of the linear reduced form is accomplished in the same manner as described previously for the isolation of somatostatin.

Also, the linear reduced form is obtained directly by reduction of somatostatin. Reduction with dithiothreitol according to the method of W. W. Cleland, Biochem. 3, 480 (1964) is preferred, although other agents known to be effective for the reduction of cyclic disulfides to the corresponding disulfhydryl derivative are applicable, for example, sodium bisulfite followed by hydrolysis of the intermediate dithiosulfate derivative.

The following examples illustrate further this invention.

EXAMPLE 1 t-Butyloxycarbonylalanylglycine Methyl Ester (Boc-Ala-Gly-OMe)

To a cooled (0°C), stirred solution of t-butyloxycarbonylalanine (14.18 g, 0.075 mole) and 1-hydroxybenzotriazole (10.1 g, 0.075 mole) in DMF (150 ml) is added DDC (18.2 g, 0.088 mole). The stirring is continued for 1 hr at 0°C and then for 1 more hr at room temperature. To this mixture is added a solution of glycine methyl ester hydrochloride (10 g, 0.0798 mole) in DMF (400 ml) and N-ethylmorpholine (12.8 ml). The mixture is stirred overnight at room temperature. The precipitate is removed by filtration and the filtrate evaporated to dryness. The residue is dissolved in ethyl acetate (insoluble part is removed by filtration). The solution is washed with 10% aqueous citric acid (3 × 75 ml), a saturated sodium bicarbonate solution (3 × 100 ml), a saturated sodium chloride solution (2 × 50 ml) and dried (MgSO$_4$). Evaporation of the solvent affords the title compound as an oil, nmr (CDCl$_3$) δ 1.33 (s, 3H), 1.42 (s, 9H), 3.75 (s, 3H).

EXAMPLE 2 t-Butyloxycarbonylalanylglycine (Boc-Ala-Gly-OH)

To a stirred solution of t-butyloxycarbonylalanylglycine methyl ester (86 g, 0.33 mole, described in Example 1) in methoxyethanol (600 ml) is added 1N NaOH (350 ml) dropwise within a few minutes. The reaction is completed in 2 hr. The reaction mixture is cooled and carefully adjusted to pH 4 with a 50% citric acid solution (≈60 ml). The solvent is evaporated, the residue is dissolved in ethyl acetate and the undissolved part removed by filtration. The filtrate is dried (MgSO$_4$) and the solvent evaporated. The crude product is recrystallized from ethyl acetate-petroleum ether (60° – 80°C) affording the title compound, $[\alpha]_D^{25}$ =–9.6° (c=1, DMF), m.p. 128°C (dec).

EXAMPLE 3 t-Butyloxycarbonylalanylglycine 2,4,5-Trichlorophenyl Ester (Boc-Ala-Gly-OTcp)

To a cooled (−10° to −15°C), stirred solution of t-butyloxycarbonylalanylglycine (56 g, 0.227 mole described in Example 2) and 2,4,5-trichlorophenol (58.5 g, 0.237 mole) in dry ethyl acetate (600 ml) is added dropwise a solution of DCC (61 g, 0.295 mole) in ethyl acetate (100 ml). The mixture is stirred for 2 hr. at −10°C, for 2 hr at 0°C and finally at room temperature overnight. The precipitate is removed by filtration, the solvent is evaporated and the residue dissolved in ethyl acetate (insoluble precipitate is removed by filtration). The solvent is evaporated and the residue is crystallized first from ether and then from ethyl acetate-petroleum ether to give the title compound, m.p. 109° – 111°C, $[\alpha]_D^{25}$ = −18.7° (c=1, DMF).

EXAMPLE 4 t-Butyloxycarbonylphenylalanylphenylalanine Methyl Ester (Boc-Phe-Phe-OMe)

To a stirred, cooled (0°C) solution of t-butyloxycarbonylphenylalanine (Boc-Phe-OH, 21.2 g, 0.08 mole) and 1-hydroxybenzotriazole (10.8 g, 0.08 mole in DMF (120 ml) is added DCC (18.3 g, 0.089 mole). The mixture is stirred at 0°C for 1 hr and then at room temperature for an additional hour. A solution of phenylalanine methyl ester hydrochloride (17.6 g, 0.082 mole) in DMF (240 ml) and ethylmorpholine (14 ml) are added and the mixture stirred overnight at 25°C. The precipitate is removed by filtration and the filtrate evaporated under reduced pressure. The residue is dissolved in ethyl acetate and the solution washed with 10% aqueous citric acid (2 × 160 ml), saturated sodium bicarbonate (3 × 200 ml) and saturated sodium chloride (2 × 120 ml). The solution is dried (MgSO$_4$), the solvent evaporated and the residue recrystallized from ethyl acetate-petroleum ether to give the title compound, m.p. 123° – 124° C, $[\alpha]_D^{25}$= −13.4° (c=1, DMF).

EXAMPLE 5

Phenylalanylphenylalanine Methyl Ester Trifluoroacetate (H-Phe-Phe-OMe . CF$_3$CHOOH)

t-Butyloxycarbonylphenylalanylphenylalanine methyl ester (25 g, 0.058 mole, described in Example 4) is dissolved in cold trifluoroacetic acid at 0°C and the solution is stirred at 0°C for 1.5 hr. Trifluoroacetic acid is evaporated under reduced pressure and methanol is added (1 –5 ml) to the evaporation residue. The mixture crystallizes and after addition of ether the crystals are separated by filtration and washed with ether to give the title compound, m.p. 250°C (dec), $[\alpha]_D^{25}$ = 10.6° (c=1, DMF) after recrystallization from methanol:isopropyl ether.

EXAMPLE 6 t-Butyloxycarbonylasparaginylphenylalanylphenylalanine Methyl Ester (Boc-Asn-Phe-Phe-OMe)

To a solution of H-Phe-Phe-OMe.CF$_3$COOH (23.7 g, 0.054 mole, described in Example 5) in DMF (100 ml) is added N-ethylmorpholine (7.84 ml) and t-butyloxycarbonylasparagine trichlorophenyl ester (22.6 g, 0.055 mole). The mixture is kept at 0°C for 3½ days. The solvent is evaporated and the residue triturated with ether and the solid separated. Recrystallization of the solid from methanol gives the title compound, m.p. 194° – 195°C, $[\alpha]_D$ = −34.0° (c=1, DMF).

EXAMPLE 7

Benzyloxycarbonyl-N$^\epsilon$ -t-butyloxycarbonyllysylasparaginylphenylalanylphenylalanine Methyl Ester

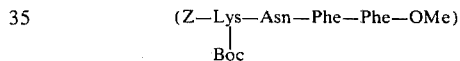

Boc-Asn-Phe-Phe-OMe, (22.5 g, 0.0417 mole, described in Example 6) is dissolved in cold trifluoroacetic acid (150 ml) and the solution stirred at 0°C for 1 hr. The solvent is evaporated, the residue dissolved in methanol. Addition of ether affords H-Asn-Phe-Phe-OMe.CF$_3$COOH as a solid. To a cooled (0°C), stirred solution of the latter compound (9.5 g, 0.0172 mole) in DMF (70 ml) is added N-ethylmorpholine (2.4 ml) and a solution of

(10 g, 0.02 mole in DMF (50 ml). The solution is kept at 0° for 2 days. The solvent is then evaporated under reduced pressure. The residue is crystallized from methanol to give the title compound, m.p. >200°C.

| Analysis: | C | H | N |
|---|---|---|---|
| Calc'd. | 63.79% | 6.66% | 10.88% |
| Found | 62.94 | 6.71 | 10.49 |

EXAMPLE 8

N-(α-Phenyl-5-chloro-2-hydroxybenzylidene)-S-acetamidomethylcysteine Dicyclohexylamine Salt

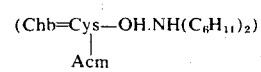

S-Acetamidomethylcysteine hydrochloride (19.6 g, 0.085 mole) and 5-chloro-2-hydroxybenzophenone (19.7 g, 0.085 mole) are dissolved in a solution of tetramethylammonium hydroxide in methanol (340 ml, 0.5 mmole/ml). About 5 g of hydrated alkali-aluminum silicate (3A Molecular Sieves) are added and the mixture is stirred for 1 day at room temperature. The solid is removed by filtration and the filtrate evaporated to dryness. The residue is dissolved in an ice-water mixture (800 ml) and the insoluble material is removed by filtration (unreacted ketone). The filtrate is cooled and rendered acidic with solid citric acid (pH 4) and extracted with ethyl acetate (3 × 200 ml). The extract is washed with cold water and dried (MgSO$_4$) for a short time. MgSO$_4$ is removed by filtration and to the filtrate is added a solution of dicyclohexylamine (15.5 g, 0.085 mole) in ethyl acetate (50 ml). The title compound is obtained as crystals, m.p. 161° – 163°C.

EXAMPLE 9

N-(α-Phenyl-5-chloro-2-hydroxybenzylidene)-S-acetamidomethylcysteinyl-N$^\epsilon$-t-butyloxycarbonyl-lysylasparaginylphenylalanylphenylalanine methyl ester hydrate

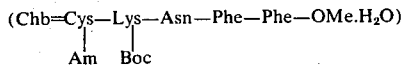

A suspension of N-(α-phenyl-5-chloro-2-hydroxybenzylidene)-S-acetamidomethylcysteine dicyclohexylamine salt (12 g, 20.4 mmole, described in Example 8) in water (200 ml) is adjusted to pH 4 by the addition of a 10% citric acid solution (≈55 ml). The free acid is extracted with ethyl acetate, the extract washed with water and dried overnight with anhydrous magnesium sulfate at 0° to 10°C. (Note: a decomposition occurs at room temperature). The solvent is evaporated, the residue dissolved in DMF (150 ml) and the solution of the free cysteine derivative is used immediately, see below.

A solution of the protected tetrapeptide,

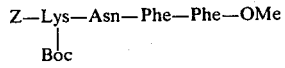

(11.7 g, 0.0152 mole, described in Example 7) in dry distilled DMF (210 ml) and glacial acetic acid (210 ml) is hydrogenated in the presence of 5% Pd-C (1.7 g). The reduction is completed in 2 hr. The catalyst is removed by filtration, the solvent evaporated and the residue dissolved in methanol and precipitated with ether giving the deprotected tetrapeptide

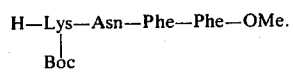

To the above solution of the protected cysteine derivative in DMF (vide supra) is added 1-hydroxybenzotriazole (2.7 g, 0.02 mole). To the stirred cooled (−10°C) solution is added DCC (4.1 g, 0.02 mole) and the mixture kept at −10°C for 30 min, at 0°C for 1 hr and at room temperature for 1 hr. A solution of the deprotected tetrapeptide (vide supra) in DMF (200 ml) and N-ethylmorpholine (2.6 ml) is added to the cooled (0°C) mixture and the stirring continued overnight at room temperature. The precipitate is removed by filtration and the filtrate evaporated to dryness. The residue is dissolved in methanol and precipitated with ether. The product is crystallized from methanol-water, giving the title compound, [α]$_D$$^{20}$ = −33.3° (c=1, DMF), nmr (CDCL$_3$) δ 1.35 (s, 9H), 1.8 (s, 3H), 3.55 (s, 3H), 1.0 – 1.6 (m, 6H).

EXAMPLE 10 t-Butyloxycarbonylalanylglycyl-S-acetamidomethyl-cysteinyl-N$^\epsilon$-t-butyloxycarbonyllysylasparaginyl-phenylalanylphenylalanine Methyl Ester

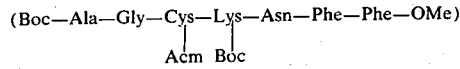

The protected pentapeptide,

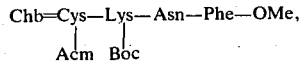

(13.3 g, 0.0127 mole, described in Example 9) is dissolved in an 80% acetic acid solution (500 ml) and the solution stirred for 20 hr. The solvent is evaporated under reduced pressure. The residue is dissolved in methanol and precipitated with ether to

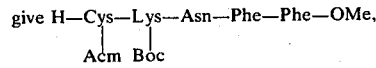

[α]$_D$$^{25}$ = −29.1° (c=1, DMF).

To a cold solution of the latter compound in DMF (185 ml) at 0°C is added N-ethylmorpholine (2 ml, pH=8) followed by a cold solution of t-butyloxycarbonylalanylglycine-2,4,5-trichlorophenyl ester (7.5 g, 0.0176 mole). The solution is kept in an ice-bath for 2 days. The solvent is evaporated. The residue is dissolved in ethanol and precipitated with ether. Recrystallization of the precipitate from methanol gives the title compound; [α$_D$$^{25}$ = −30.9° (c=1, DMF); nmr (CDCL$_3$) δ 1.38 (s, 18H), 3.58 (s, 3H), 7.25 (m, 10H); amino acid analysis: Ala, 1.05; Asp, 1.16; Cys, 0.174; Gly, 1.00; Lys, 1.21; Phe, 1.86.

EXAMPLE 11 t-Butyloxycarbonylalanylglycyl-S-acetamidomethyl-cysteinyl-N$^\epsilon$-t-butyloxycarbonyllysylasparaginyl-phenylalanylphenylalanine Hydrazide

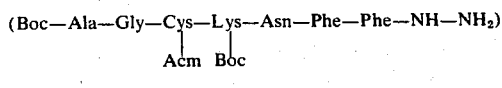

To a solution of the heptapeptide ester,

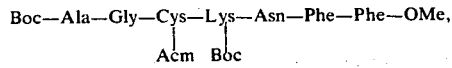

(2.0 g, 1.87 mmole, described in Example 10) in dimethylsulfoxide (8 ml) is added hydrazine hydrate (2 ml, 41.3 mmole). The mixture is stirred for 8 hr. The title compound is precipitated with water (≈150 ml), filtered and dried; amino acid analysis: Lys, 0.98; Asp, 1.04; Gly, 1.0; Ala, 1.01; 1/2 Cys, 0.37; Phe, 2.12.

EXAMPLE 12

N,S-Ditritylcysteinyl-N ϵ -t-Butyloxycarbonyllysylasparaginylphenylalanylphenylalanine Methyl Ester

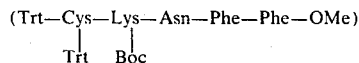

To a cooled stirred mixture of ethyl acetate (100 ml) and 5% aqueous citric acid (400 ml) at 0°C is added N,S-ditritylcysteine diethylamine salt (15.82 g, 0.023 mole). The mixture is stirred to 0°C for 30 min. The layers are separated. The aqueous layer is extracted with ethyl acetate and the combined organic phases are washed with cold 2.5% citric acid and saturated sodium chloride solutions. The combined organic phases asre dried (MgSO$_4$). The solvent is evaporated to give N,S-ditritylcysteine.

To a solution of the latter compound (0.023 mole in DMF (100 ml) is added 1-hydroxybenzotriazole (3.75 g, 0.0278 mole). To the stirred solution at 0°C is added DCC (4.81 g, 0.0233 mole). The mixture is stirred at 0°C for 2 hr and at room temperature for 1 hr. To the cooled stirred solution at 0°C is added a solution of

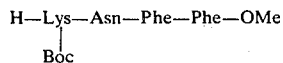

(14 g, 0.0175 mole) in DMF (254 ml) and N-ethylmorpholine (2.53 ml). The mixture is stirred 16 hr at 25°C. The solvent is evaporated to ≈100 ml and the resulting precipitate collected by filtration. The filtrate is evaporated to dryness. The residue is dissolved in ethyl acetate (400 ml) the solution filtered in order to remove some precipitate (discarded). The filtrate is washed with 2.5% aqueous citric acid (3 × 100 ml), 7% sodium bicarbonate (3 × 100 ml) and a saturated sodium chloride chloride solution (2 × 50 ml). The solution is dried (MgSO$_4$)and the solvent evaporated. The residue is crystallized from ethyl acetate-petroleum ether giving the title compound, m.p. 180° – 181°C, $[\alpha]_D^{25} = 17.9°$ (c=1, DMF).

EXAMPLE 13 t-Butyloxycarbonylalanylglycyl-S-tritylcysteinyl-N ϵ- t-butyloxycarbonyllysylasparaginylphenylalanyl- phenylalanine Methyl Ester

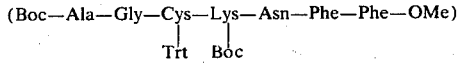

To a solution of

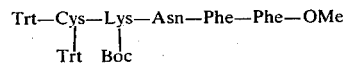

(13.5 g, 10.7 mmole, described in Example 12) in glacial acetic acid (800 ml), water (200 ml) is added dropwise at room temperature. The solution is stirred at 45°C for 2 hr, diluted with water (1000 ml) and the precipitate removed by filtration. The filtrate is evaporated to dryness. The residue is dissolved in methanol and the product precipitated with ether giving

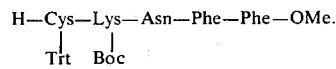

To a cooled solution of the latter compound (10.2 g, 9.48 mmole) in DMF (79 ml) at 0°C is added N-ethylmorpholine (1.5 ml), a solution of t-butyloxcarbonylalanylglycine 2,4,5-trichlorophenyl ester (5.64 g, 13.3 mmole, described in Example 3) in DMF (25 ml) and a catalytic amount of 1-hydroxybenzotriazole (≈0.5 g). The solution is kept for 3 days at 0°C. The solvent is evaporated. The residue is dissolved in methanol. Addition of ether results in a precipitate. Crystallization of the precipitate from methanol gives the title compound; $[\alpha]_D^{25} = -20.7°$(c=1, DMF); amino acid analysis: Lys, 0.95; Asp, 0.94; Gly, 1.0; Ala, 0.98; Cys, 0.52; Phe, 1.92.

EXAMPLE 14 t-Butyloxycarbonylalanylglycyl-S-tritylcysteinyl-N ϵ - t-butyloxycarbonyllysylasparaginylphenylalanyl- phenylalanine Hydrazide

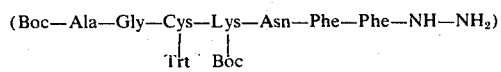

To a solution of the heptapeptide methyl ester,

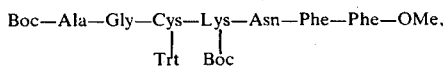

(6.5 g, 5.25 mmole, described in Example 13) in methanol (410 ml) cooled in an ice-bath, hydrazine hydrate (8.8 ml, 0.179 mole) is added dropwise. The mixture is stirred at 0°C for 20 min. Stirring is then continued for 4 days at room temperature. The precipitate is collected, washed with cold methanol and dried giving the title compound; amino acid analysis: Lys, 0.95; Asp, 1.0; Gly, 1.0; Ala, 1.0; Cys, 0.91; Phe, 2.03.

EXAMPLE 15

Benzyloxycarbonylthreonylserine Methyl Ester (Z-Thr-Ser-OMe)

A solution of benzyloxycarbonylthreonine pentachlorophenyl ester (3.22 g, 6.43 mmol) in DMF (20 ml) is added to a solution of serine methyl ester hydrochloride (1.0 g, 6.43 mmol) in DMF (15 ml) and triethylamine (0.895 ml) at 0°C. The mixture is stirred for 20 hr at room temperature and filtered. The filtrate is concentrated under reduced pressure. The residue is triturated with ether-petroleum ether (1:1) until all the pentachlorophenol is removed. The insoluble residue is crystallized from ethyl acetate-isopropyl ether giving the title compound; m.p. 133° – 135°C; nmr (CDCL$_3$) δ 3.75 (3H), 5.1 (2H), 7.3 (5H).

EXAMPLE 15a

Benzyloxycarbonyl-(O-t-butyl)threonyl-(O-t-butyl) serine Methyl Ester

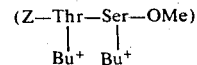

A mixture of O-t-butylserine methyl ester (13.3 g, 43 mmole) and benzyloxycarbonyl-(O-t-butyl)threonine (14.4 g, 46.8 mmole) and N-ethylmorpholine (5.33 ml, 43 mmole) in dry THF (100 ml) is cooled to 0°C and 1-hydroxybenzotriazole (11.6 g, 86 mmole) is added. A cooled solution of DCC (9.3 g, 45.1 mmole) in THF (25 ml) is then added dropwise and the reaction mixture stirred for 45 min. at 0°C and 90 min. at 25°C. After filtration the THF is removed under reduced pressure at 25°C. The residue is dissolved in ether, filtered and the filtrate subsequently extracted with saturated $NaHCO_3$ solution, saturated NaCl solution, ice cold citric acid (1N), water, saturated $NaHCO_3$ solution, water and saturated NaCl solution. The organic extract is dried ($MgSO_4$) and evaporated under reduced pressure. The residue is subjected to chromarography on alumina (neutral). Elution with benzene gives the title compound as an oil; nmr ($CDCL_3$) δ 1.2 (m, 21H), 3.74 (s, 3H), 5.15 (s, 2H), 7.35 (s, 5H).

EXAMPLE 16

Benzoyloxycarbonylphenylalanylthreonylserine Methyl Ester (Z-Phe-Thr-Ser-OMe)

A mixture of benzyloxycarbonylthreonylserine methyl ester (1.72 g, 4.86 mmole, described in Example 15) in 15% acetic acid (15 ml) and methanol (15 ml), 1 N hydrochloric acid (5.34 ml, 5.34 mmole) and 5% Pd/C (0.15 g) is stirred rapidly under an atmosphere of hydrogen for 20 hr. The mixture is filtered through diatomaceous earth (Celite) and the filtrate concentrated to dryness to give threonylserine methyl ester hydrochloride, H-Thr-Ser-OMe.HCl.

To a solution of the latter compound (1.24 g, 4.86 mmole) in DMF (15 ml) and triethylamine (0.623 ml), a solution of benzyloxycarbonylphenylalanine 2,4,5-trichlorophenyl ester (2.32 g, 4.86 mmoles) is DMF (30 ml) is added at 0°C. The mixture is stirred for 20 hr and filtered. The filtrate is concentrated under reduced pressure and the residue is triturated with ether-hexane until all the trichlorophenol is removed. The residue is crystallized from ethyl acetate-isopropyl ether to give the title compound; m.p. 167° – 171°C; nmr ($CDCL_3$) δ 3.7 (3H), 5.03, (2H), 7.2 and 7.3 (10H).

EXAMPLE 16a

Benzyloxycarbonylphenylalanyl-(O-t-butyl)theronyl-(O-t-butyl)serine Methyl Ester

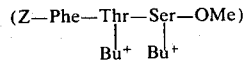

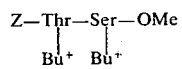

(14.4 g, 30.8 mmoles, described in Example 15a) dissolved in methanol (120 ml) with pyridine hydrochloride (3.56 g, 30.8 mmole) is hydrogenated with 5% Pd/C (700 mg) as catalyst to give

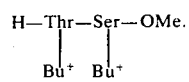

Z-Phe-OTcp (14.7 g, 30.8 mmole) and the preceding product are dissolved in ethyl acetate (150 ml) and cooled to 0°C. N-ethylmorpholine (3.96 ml, 30.8 mmole) is then added and the mixture kept at 5°c for 3 days. After filtration the filtrate is extracted as described in Example 15a. The extract is dried and evaporated under reduced pressure. The residue is subjected to chromatography on silica gel (1 kg) using 20% ethyl acetate in benzene. Evaporation of the eluate and crystallization from ether-hexane gives the title compound; m.p. 101° – 103°C., $[\alpha]_D^{25} = 9.4$ (c=1, DMF).

EXAMPLE 17

Benzoylcarbonylthreonylphenylalanylthreonylserine Methyl Ester (Z-Thr-Phe-Thr-Ser-OMe)

A mixture of benzyloxycarbonylphenylalanylthreonylserine methyl ester (1.7 g, described in Example 16) in 15% acetic acid (15 ml) and methanol (15 ml) and 5% Pd/C (0.15 g) is stirred rapidly under an atmosphere of hydrogen for 4 hr. The mixture is filtered through diatomaceous earth (Celite) and the filtrate concentrated to dryness to give H-Phe-Thr-Ser-OMe in the form of its acetic acid addition salt.

To a solution of the latter compound (1.4 g, 3.4 mmole) in DMF (20 ml) and triethylamine (0.48 ml) at 0°C, a solution of benzyloxycarbonylthreonine pentachlorophenyl ester (1.71 g, 3.4 mmole) in DMF (15 ml) is added. The solution is stirred for 20 hr at room temperature and then the solvent is removed. The residue is triturated with ether until all the pentachlorophenol is removed. the residue is crystallized from ethyl acetate-isopropyl ether to give the title compound as a monohydrate; m.p. 195°–197°C.

Analysis: Calc'd for $C_{29}H_{38}N_4O_{10} \cdot H_2O$: C 56.12; H, 6.49; N, 9.02% Found : C56.06; H, 6.29: N, 8.84%

EXAMPLE 17a

Benzyloxycarbonyl-(O-t-butyl)threanylphenylalanyl-(O-t-butyl)threonyl-(O-t-butyl)serine Methyl Ester

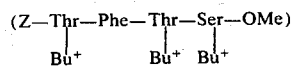

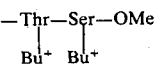

(10.5 g, 17.1 mmoles, described in Example 16a) is hydrogenated in glacial acetic acid (100 ml) with 5% Pd/C (1 g) as catalyst. After completion (checked by TLC) the catalyst is collected and the filtrate taken to dryness under reduced pressure. The residue,

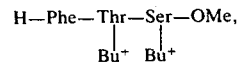

is taken in benzene and evaporated under reduced pressure (twice) and dried over KOH pellets at reduced pressure.

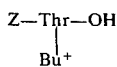

(5.3 g, 17.1 mmole) and 1-hydroxybenzotriazole (4.61 g, 34.2 mmole) are dissolved in dry THF (100 ml). While stirring at 0°C a cooled solution of DCC (3.52 g, 17.1 mmole) in THF (30 ml) is added dropwise to the latter solution. Stirring is continued for 1 hr at 0°C and 1 hr at 25°C. The above hydrogenolysis product is dissolved in THF (35 ml) containing N-ethylmorpholine (2.19 ml, 17.1 mmole) and added to the solution of the activated ester. After stirring at 25°C for 1 hr the reaction mixture is filtered and the filtrate evaporated under reduced pressure. The residue is taken in ether, filtered and the filtrate is extracted with cold citric acid (1N), water, saturated NaHCO₃ solution and saturated NaCl solution. The residue left after drying and evaporating the ether layers is subjected to chromatography on silica gel (1 kg) using 20% ethyl acetate in benzene as eluent. The eluate is evaporated and the residue is crystallized from ether-hexane to give the title compound; m.p. 110°-113°C; $[\alpha]_D^{25} = 27.5°$ (c=1, DMF).

EXAMPLE 18

Benzyloxycarbonyl-N$^\epsilon$ t-Butyloxycarbonyltysyl-threonylphenylalanylthreonylserine Methyl Ester

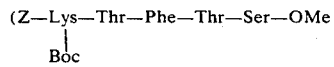

A mixture of Z-Thr-Phe-Thr-Ser-OMe (1.3 g, described in Example 17) in methanol (30 ml) and 5% Pd/C (0.15 g) is stirred rapidly under an atmosphere of hydrogen for 20 hr. The mixture is filtered through diatomaceous earth and the filtrate concentrated to dryness to give H-Thr-Phe-Thr-Ser-OMe.

To a solution of the latter compound (1.0 g, 2.18 mmole) in DMF (15 ml) and triethylamine (0.1 ml) at 0°C, a solution of benzyloxycarbonyl-N$^\epsilon$ -t-butyloxycarbonyllysine p-nitrophenyl ester in DMF (15 ml) is added. The solution is stirred for 20 hr and the solvent removed under reduced pressure. The residue is dissolved in methanol (3 ml) and slowly added to ether (100 ml). The precipitate is collected and crystallized from methanol to give the title compound; m.p. 169°-171°C; nmr (DMSO-d₆) δ 1.36 (9H), 3.65 (3H), 5.05 (2H), 7.3 (10H).

EXAMPLE 18a

Benzyloxycarbonyl-N$^\epsilon$ butyloxycarbonyllysyl-(O-t-butyl)threonyl-phenylalanyl(O-t-butyl)threonyl-(O-t-butyl)serine Methyl Ester

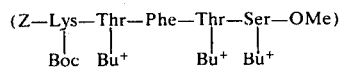

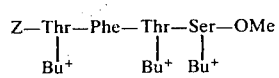

(8.52 g, 11.05 mmole), described in Example 17a, is hydrogenated in acetic acid and worked up as described in Example 17a. The resulting residue,

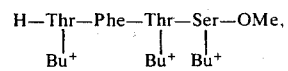

is dissolved in DMF (50 ml) and N-ethylmorpholine (1.14 g, 11.05 mmole) is added.

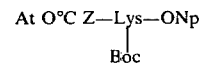

(5.54 g, 11.05 mmole) is then added, and the mixture is kept at 5°C for 70 hr. The DMF is then removed under reduced pressure at 20° - 30°C and the residue is subjected to chromatography on silica gel (1 kg) with CHCl₃ containing MeOH (2%) as eluent. Evaporation of the eluate gives the title compound; m.p. 81°-85°C after recrystallization from ether-petroleum ether; nmr (CDCl₃) δ0.99 – 1.43 (m), 3.71 (s, 3H), 5.13 (s, 2H), 7.22 and 7.33 (2 × s, 10H).

EXAMPLE 19

α,α-Dimethyl-3,5-Dimethoxybenzyloxycarbonyltryptophyl-N$^\epsilon$ -t-butyloxycarbonyllysylthreonyl-phenylalanylthreonylserine Methyl Ester

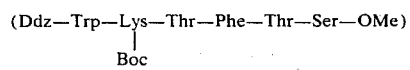

A mixture of

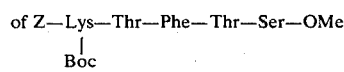

(1.61 g, described in Example 18) in 15% acetic acid (15 ml) and methanol (15 ml) and 5% Pd/C (0.15 g) is stirred rapidly under an atmosphere of hydrogen for 20 hr. The mixture is filtered through diatomaceous earth and the filtrate concentrated to dryness to give

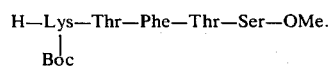

Next, a solution of α,α-dimethyl-3,5-dimethoxybenzyloxycarbonyltryptophane (0.653 g, 1.53 mmole), N-hydroxysuccinimide (0.345 g, 3.0 mmole) and DCC (0.315 g, 1.53 mmole) in dry THF (13 ml) is stirred at 0°C for 1 hr and then at 25°C for 1 hr. To this solution is added a solution of

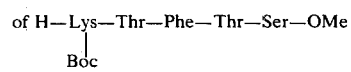

(1.159 g, 1.53 mmole), prepared as described above, and triethylamine (0.22 ml) in THF (10 ml). The mixture is stirred at 25°C for 3 hr, filtered and the filtrate concentrated. The residue is subjected to chromatography on a column of silica gel (100 g) using CHCl₃-MeOH-pyridine (90:10:1) as eluent. Evaporation of the eluate gives the title compound; $\lambda_{max}^{MeOH}$ 289 nm ($\epsilon$=5,310) 282 nm ($\epsilon$=7,410), 274 nm ($\epsilon$=7,070), 219 nm ($\epsilon$=43,700); nmr (CDCl$_3$) $\delta$ 1.40 (9H), 3.74 (9H).

EXAMPLE 19a $\alpha,\alpha$-Dimethyl-3,5-dimethoxybenzyloxycarbonyltryptophyl-N$^\epsilon$ -butyloxycarbonyllysyl-(O-t-butyl)-threonylphenylalanyl-(O-t-butyl)threonyl-(O-t-butyl)serine Methyl Ester

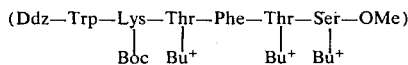

A solution of

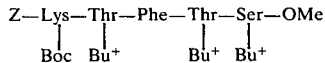

(7.3 g, 7.3 mmole), described in Example 18a, in acetic acid is hydrogenated and worked up as described previously (for example see Example 17a). This resulting residue,

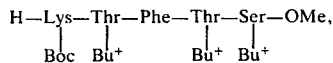

is dissolved in THF (20 ml) and N-ethyl-morpholine (0.935 ml, 7.3 mmole) is added (first mixture).

Ddz-Trp-OH (3.11 g, 7.3 mmole) is dissolved in dry THF (55 ml), 1-hydroxybenzotriazole (1.97 g, 14.6 mmole) is added and the solution cooled to 0°C. A cooled solution of DCC (1.5 g, 7.3 mmole) in THF (15 ml) is added dropwise and the reaction mixture stirred for 1 hr at 0°C and 1 hr at 20° to 25°C (second mixture).

The above first mixture is then added to the above second mixture and stirring continued for 1 hr at 20° – 25°C. The reaction mixture is then cooled at 0°C, filtered and the filtrate evaporated. The residue is dissolved in ethyl acetate. The solution is washed with saturated NaHCO$_3$ solution, saturated NaCl solution and dried (MgSO$_4$). The solution is concentrated and the residue is subjected to chromatography on silica gel (1 kg), as described before. Evaporation of the eluate gives the title compound; m.p. 112°–114°C after recrystallization from ether-petroleum ether; [$\alpha$]$_D^{25}$ = 10.1° (C=1, DMF).

EXAMPLE 20

$\alpha,\alpha$-Dimethyl-3,5-dimethoxybenzyloxycarbonyltryptophyl-N$^\epsilon$ -t-butyloxycarbonyllysylthreonylphenylalanylthreonylserine Hydrazide

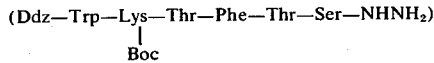

A solution of

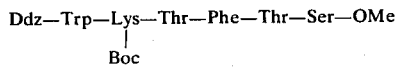

(1.05 g, 0.95 mmole, described in Example 19) and hydrazine hydrate (1.2 ml) in methanol (50 ml) is stirred at 0°C for 2 days. The precipitate is collected and washed with methanol to afford the title compound; m.p. 203° – 206°C.

EXAMPLE 20a $\alpha,\alpha$-Dimethyl-3,5-dimethoxybenzyloxycarbonyltryptophyl-N$^\epsilon$ -butyloxycarbonyllysyl-(O-t-butyl)-threonylphenylalanyl-(O-t-butyl)threonyl-(O-t-butyl)serine Hydrazide

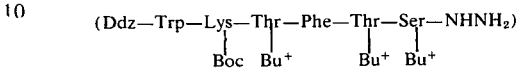

A solution of

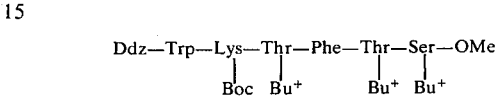

(3.71 g, 29.1 mmole, described in Example 19a) in DMF (25 ml) is mixed with hydrazine hydrate (5 ml). The mixture is left for 3 days at room temperature. Addition of water to the mixture, collection of the precipitate and crystallization of the precipitate from methanol gives the title compound, m.p. 189° – 191°C.

EXAMPLE 21

$\alpha,\alpha$-Dimethyl-3,5-dimethoxybenzyloxycarbonyltryptophyl-N $^\epsilon$ -t-butyloxycarbonyllysylthreonylphenylalanylthreonylseryl-S-acetamidomethylcysteine

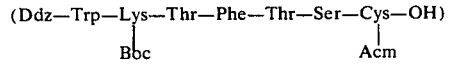

To a solution of

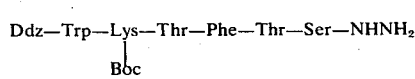

(0.800 g, 0.724 mmole, described in Example 20) in DMF (30 ml) at −20°C is added 2.2 N anhydrous hydrochloric acid in ethyl acetate (0.824 ml, 1.81 mmole) followed by t-butyl nitrite (0.125 ml, 1.08 mmole). The mixture is stirred at -15°C for 15 minutes. A solution of S-acetamidomethylcysteine (0.165 g, 0.724 mmole) and triethylamine (0.354 ml, 2.53 mmole) in DMF (15 ml) is added dropwise to the above solution at −15°C. After completion of the addition the solution is stirred at −15°C for 1 hour and then for 20 hours at 5°C. The solvent is removed under reduced pressure. The residue is dissolved in methanol (5 ml) and slowly added to ether (400 ml). The precipitate is collected, dissolved in methanol (5 ml) and slowly added to cold 0.5 M citric acid (100 ml). The precipitate is collected and washed with water (2 × 20 ml). The precipitate is crystallized from methanol-ethyl acetate-isopropyl ether to give the title compound; m.p. 139° – 142°C; nmr (DMSO-d$_6$) $\delta$ 1.35 (9H), 1.55 (6H), 1.83 (3H), 3.70 (6H).

EXAMPLE 21a $\alpha,\alpha$-Dimethyl-3,5-dimethoxybenzyloxycarbonyltryptophyl-N $^\epsilon$ -t-butyloxycarbonyllysylthreonylphenylalanylthreonylseryl-S-tritylcysteine

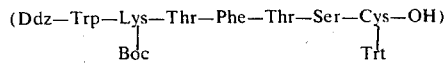

To a solution of

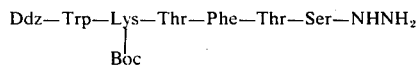

(1.6 g, 1.45 mmole, described in Example 20) in DMF (50 ml) at −20°C is added 2.24 N anhydrous hydrochloric acid in ethyl acetate (1.62 ml, 2.26 mmole) followed by t-butyl nitrite (0.253 ml, 2.18 mmole) and the mixture is stirred at −15°C for 15 minutes. A solution of S-tritylcysteine (0.527 g, 1.45 mmole) and triethylamine (0.71 ml, 5.07 mmoles) in DMF (80 ml) is added dropwise to the above solution at −15°C. After completion of the addition the solution is stirred at −15°C for 1 hr, and then for 20 hr at 5°C. The solvent is removed under reduced pressure. The residue is crystallized from methanol; m.p. 205°–208°C, nmr (DMSO-$d_6$) δ 1.40 (9H), 1.60 (6H), 3.75 (6H), 7.40 (20H).

EXAMPLE 21b

α,α-Dimethyl-3,5-dimethoxybenzyloxycarbonyltryptophyl-$N^\epsilon$ -t-butyloxycarbonyllysyl-(O-t-butyl)-threonylphenylalanyl-(O-t-butyl)threonyl-(O-t-butyl)seryl-S-acetamidomethylcysteine

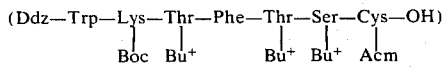

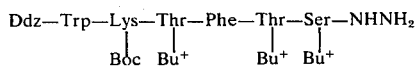

(1.27 g, 1 mmole, described in Example 20 a) is dissolved in dry, distilled DMF (25 ml) and cooled to −20°C. Hydrochloric acid in ethyl acetate (1N, 2.5 ml) is added followed by t-butyl nitrite (0.138 ml, 1.2 mmole). The mixture is stirred for 15 min at −15°C. A solution of S-acetamidomethyl cysteine hydrochloride (228 mg, 1 mmole) in DMF (20 ml) containing triethylamine (0.49 ml, 3.5 mmole) is cooled to −15°C and added to the above reaction mixture. Stirring is continued at −15°C for 1 hr and at room temperature overnight. The reaction mixture is evaporated under reduced pressure. The residue is triturated with water. The precipitate is collected, washed and dried to give the title compound; nmr (CDCl$_3$) δ 1.12, 1.20 and 1.27 (27H), 1.45 (9H), 1.63 (6H), 1.95 (3 H), 3.68 (6H), amino acid analysis: Lys, 1.0; Thr, 2.0; Ser, 0.76; Cys, 0.6; Phe, 1.0.

EXAMPLE 21c

α,α-Dimethyl-3,5-dimethoxybenzyloxycarbonytryprophyl-$N^\epsilon$ -t-butyloxycarbonyllysyl-(O-t-butyl)-threonylphenylalanyl-(O-t-butyl)threonyl-(O-t-butyl)seryl-(S-trityl)cysteine

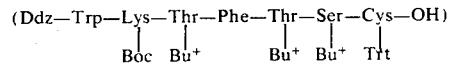

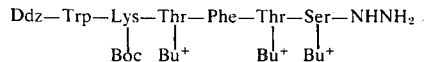

(1.27 g, 1 mmole, described in Example 20a) is dissolved in dry distilled DMF (20 ml) and cooled to −20°C. Hydrochloric acid in EtOAc (2N; 1.25 ml) is added followed by t-butyl nitrite (0.137 ml; 1.2 mmoles). The mixture is stirred for 15 min at −15°C. A solution of

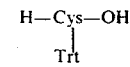

(0.363 g, 1 mmole) in DMF (35 ml) containing triethylamine (0.49 ml, 3.5 mmoles) is cooled to −15°C and added to the above reaction mixture. Stirring is continued at −15°C for 1 hr and at 20° – 25°C overnight. The reaction mixture is evaporated under reduced pressure (0.2 mm) at 35°C. The residue is triturated with ice cold citric acid (1N), filtered and washed with water. After drying the residue is triturated with hexane and the residue redried to yield the title compound; nmr (CDCl$_3$) δ 1.13, 1.17 and 1.23 (27H), 1.47 (9H), 1.74 (6H), 3.78 (6H).

EXAMPLE 22

Tryptophyl-$N^\epsilon$ -t-butyloxycarbonyllysylthreonylphenylalanylthreonylseryl-S-acetamidomethylcysteine Acetate

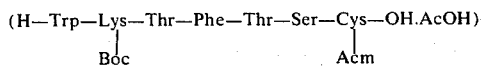

A solution of

Ddz—Trp—Lys—Thr—Phe—Thr—Ser—Cys—OH
           |                               |
           Boc                    Acm (0.465 g, 0.367 mmole, described in Example 21) in 80% acetic acid (25ml) is stirred at room temperature for 27 hr. The solvent is removed under reduced pressure. The residue is dissolved in acetic acid (3 ml) and slowly added to ether (300 ml). The precipitate is collected and dried to give the title compound, nmr (DMSO-$d_6$) δ 1.34 (9H), 1.90 (3H).

EXAMPLE 22a

Tryptophyl-$N^\epsilon$ -t-butyloxycarbonyllysylthreonylphenylalanylthreonyl-S-tritylcysteine Acetate

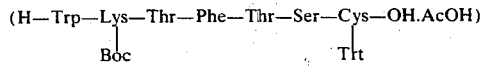

A solution of

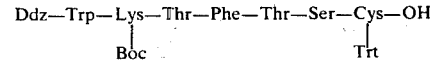

(1.02 g, 0.710 mmole, described in Example 21a) in 80% acetic acid (50 ml) is stirred at room temperature for 27 hr. Water (100 ml) is added. The precipitate is collected, washed with ether and dried to give the title compound, nmr (DMSO-$d_6$) δ 1.40 (9H), 7.35 (20H).

EXAMPLE 22b

Tryptophyl-$N^\epsilon$-butyloxycarbonyllysyl-(O-t-butyl)-threonylphenylalanyl-(O-t-butyl)threonyl-(O-t-butyl)seryl-S-acetamidomethylcysteine

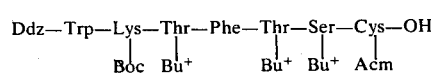

(1.50 g, 1.045 mmole, described in Example 21b) is dissolved in cold acetic acid-formic acid-water mixture (7:1:2, 12 ml) and stirred overnight at room temperature. The solvent is evaporated. The residue is dissolved in methanol. The pH of the solution is adjusted to ≈6.5 with conc. ammonium hydroxide solution and the product precipitated by adding the solution to water. After drying, the product is redissolved in methanol and precipitated by addition to cold ether to give the title compound; nmr (CDCl$_3$) δ 1.17, 1.20 and 1.27 (27H), 1.41 (9H), 1.91 (3H); amino acid analysis: Lys, 1.0; Thr, 2.2; Ser. 0.65, 1/2 Cys, 0.69; Phe, 1.1.

EXAMPLE 22c

Tryptophyl-$N^\epsilon$-t-butyloxycarbonyllysyl-(O-t-butyl)-threonylphenylalanyl-(O-t-butyl)threonyl-(O-t-butyl)seryl-S-tritylcysteine

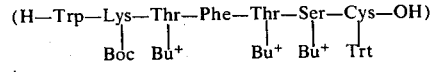

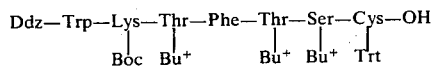

(5.13 g, 3.2 mmole, described in Example 21c) is dissolved in an acetic acid-formic acid-water mixture (7:1:2, 56 ml) and the solution is stirred overnight at room temperature. The solvent is evaporated. The residue is dissolved in methanol (26 ml) and conc. ammonia solution is added to adjust pH to about 6.5. The solution is added dropwise to cold water and the precipitate is collected and dried in a desiccator (P$_2$O$_5$). The solid is triturated several times with petroleum ether and redried to give the title compound; amino acid analysis: Lys, 1.0; Thr, 2.12; Ser, 0.67; Cys, 0.16; Phe, 1.12.

EXAMPLE 23 t-Butyloxycarbonylalanylglycyl-S-acetamidomethyl-cysteinyl-$N^\epsilon$-t-butyloxycarbonyllysylasparaginyl-phenylalanylphenylalanyltryptophyl-$N^\epsilon$-t-butyloxycarbonyllysylthreonylphenylalanylthreonylseryl-S-acetamidomethylcysteine

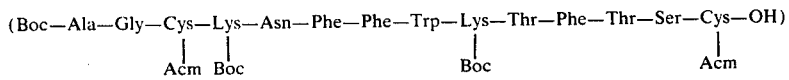

To a solution of the first heptapeptide,

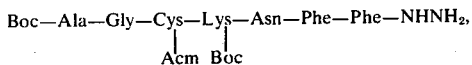

(0.327 g, 0.305 mmole, described in Example 11) in dimethylsulfoxide (DMSO) (10 ml) and DMF (10 ml) at −15°C is added 1.92 N anhydrous hydrogen chloride in ethyl acetate (0.39 ml, 0.763 mmole) followed by the addition of t-butyl nitrite (0.043 ml, 0.397 mmole). The mixture is allowed to stir at −15°C for 15 minutes. Triethylamine (0.105 ml, 0.76 mmole) is added. Then a solution of the second heptapeptide,

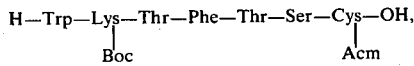

(0.337 g, 0.305 mmole, described in Example 22) in DMSO (5 ml), DMF (5 ml) and triethylamine (0.039 ml) is added to the above solution at −15°C. The resulting solution is stirred at −15°C for 1 hr, at 0°C for 0.5 hr and at 25°C for 3 hr. The solvent is removed under reduced pressure and the residue slowly added to ether (100 ml). Collection of the resulting precipitate gives the title linear tetradecapeptide. Amino acid analysis for the product is as follows: Lys, 2.09; Asp, 1.04; Thr, 2.08; Ser, 0.86; Gly, 1.00; Ala, 1.05; Cys, 0.54; Phe, 2.89.

EXAMPLE 23a t-Butyloxycarbonylalanylglycyl-S-tritylcysteinyl-$N^\epsilon$-t-butyloxycarbonyllysylasparaginylphenylalanyl-phenylalanyltryprophyl-$N^\epsilon$-t-butyloxycarbonyllysyl-threonylphenylalanylthreonylseryl-S-tritylcysteine

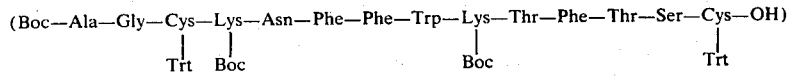

By following the procedure of Example 23 but replacing the first heptapeptide described therein with

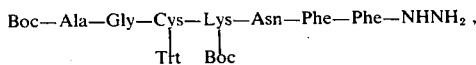

described in Example 14, and replacing the second heptapeptide described therein with

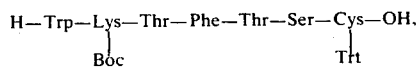

41 described in Example 22a, then the title linear tetradecapeptide is obtained. Amino acid analysis for this product is as follows: Lys, 2.01; Asp, 1.02; Thr, 1.92; Ser, 1.01; Gly, 1.0; Ala, 0.99; Cys, 0.61; Phe, 3.03.

EXAMPLE 23b t-Butyloxycarbonylalanylglycl-S-acetamidomethylcysteinyl-N$^\epsilon$ -t-butyloxycarbonyllysylasparaginyl-phenylalanylphenylalanyltryptophyl-N$^\epsilon$ -t-butyloxycarbonyllysyl-(O-t-butyl)threonylphenylalanyl-(O-t-butyl)threonyl-(O-t-butyl)seryl-S-acetamidomethylcysteine

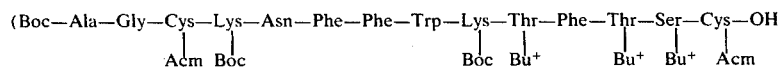

By following the procedure of Example 23 and using the first heptapeptide described therein, but replacing the second heptapeptide described therein with

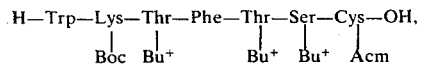

described in Example 22b, then the title linear tetradecapeptide is obtained. This linear tetradecapeptide is isolated readily from the reaction mixture by evaporating the solvent, triturating the residue with water, collecting and drying the triturated residue. This product is suitable for the next step without further purification. Part of the product gave the following amino acid analysis after recrystallization from methanol: Lys, 1.98; Asp, 1.02; Thr, 1.82; Ser, 0.93; Gly, 1.0; Ala, 0.97; Cys, 0.25; Phe, 3.02.

EXAMPLE 23c t-Butyloxycarbonylalanylglycyl-S-tritylcysteinyl-N$^\epsilon$ - t-butyloxycarbonyllysylasparaginylphenylalanyl-phenylalanyltryptophyl-N$^\epsilon$ -t-butyloxycarbonyllysyl-(O-t-butyl)threonylphenylalanyl-(O-t-butyl)threonyl-(O-t-butyl)seryl-S-tritylcysteine

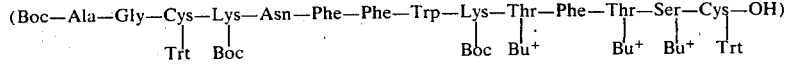

By following the procedure of Example 23, but replacing the first heptapeptide described therein with

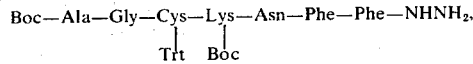

described in Example 14, and replacing the second heptapeptide described therein with

42

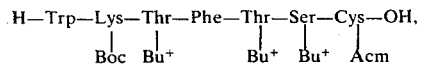

described in Example 22c, then the title linear tetradecapeptide is obtained. This linear tetradecapeptide is isolated readily from the reaction mixture by evaporating the solvent, dissolving the residue in methanol, adding dropwise the resulting solution to a 5% aqueous citric acid solution and collecting and drying the resulting precipitate. This product is suitable for the next step. Amino acid analysis for this product is as follows: Lys, 2.03; Asp, 1.18; Thr, 1.37;; Ser, 0.54; Gly, 1.0; Ala, 1.0; Cys, 0.15; Phe, 2.96.

EXAMPLE 24

Cyclic Disulfide of t-butyloxycarbonylalanylglycylcysteinyl-N$^\epsilon$-t-butyloxycarbonyllysylasparaginylphenylalanyl-phenylalanyltryptophyl-N$^\epsilon$ -t-butyloxycarbonyllysyl-threonylphenylalanylthreonylserylcysteine

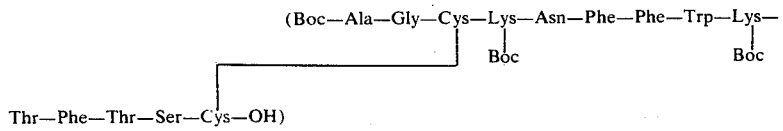

A solution of the title compound of Example 23,

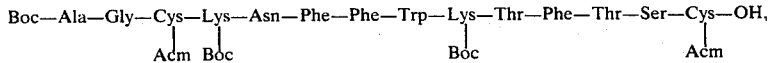

(0.635 g, 0.305 mmole) in methanol (700 ml) is added over a period of 1 hr to a solution of iodine (0.778 g, 3.05 mmole) in methanol (156 ml) at room temperature. After completion of addition, the solution is stirred at room temperature for 45 minutes. The solution is cooled to 0°C and a solution of sodium thiosulfate (1.34 g, 6.1 mmole) in water (25 ml) is added slowly. The solution is concentrated almost to dryness and added to water (100 ml). The resulting precipitate is collected and washed with water and dried to give the title compound.

The title compound is obtained also by following the procedure of this example but replacing the title compound of Example 23 with an equivalent amount of the title compound of Example 23a. In this case methanol-benzene (3:1) is a suitable reaction solvent.

In the same manner the title compounds of Examples 23 and 23a are converted to the title compound by the method of Hiskey and Smith, cited above.

EXAMPLE 24a

Cyclic Disulfide of
t-butyloxycarbonylalanylglycylcysteinyl-N -t-
butyloxycarbonyllysylasparaginylphenylalanyl-
phenylalanyltryptophyl-N -t-butyoxycarbonyllysyl-
(0-t-butyl)threonylphenylalanyl-(0-t-butyl)threonyl-
(0-t-butyl)serylcysteine (Boc—Ala—Gly—Cys—Lys—Asn—Phe—Phe—Trp—Lys—Thr—Phe—Thr—Ser—Cys—OH)
              |              |              |        |   |
              Boc            Boc  Bu⁺       Bu⁺ Bu⁺

Boc—Ala—Gly—Cys—Lys—Asn—Phe—Phe—Trp—Lys—Thr—Phe—Thr—Ser—Cys—OH,
              |                    |
              Boc                  Boc

The linear tetradecapeptide of Example 23b,

Boc—Ala—Gly—Cys—Lys—Asn—Phe—Phe—Trp—Lys—Thr—Phe—Thr—Ser—Cys—OH
              |   |                  |    |    |   |   |
              Acm Boc               Boc  Bu⁺  Bu⁺ Bu⁺ Acm (1.0 g, 0.445 mmole) is dissolved in hot methanol (900 ml). The solution is filtered in order to remove some insoluble material, cooled to room temperature and added dropwise to a solution of iodine (1.13 g, 4.45 mmole) in methanol (500 ml) within a period of 1 hr. The mixture is stirred for an additional hour, cooled to 0°C and a solution of sodium thiosulfate (2.2 g, 8.9 mmole) in water (≈20 ml) is added in order to destroy the excess of iodine. The solvent is evapaorated and the residue triturated with water (200 ml). The precipitate is collected by filtration, washed and dried. The crude product is dissolved in methanol (15 ml). The insoluble part is removed by filtration. The filtrate is evaporated to dryness giving the title compound which is suitable without purification for the next step. A portion of the product is purified by filtration through a crosslinked dextran absorbent (Sephadex LH-20) to give a purified fraction of the title compound having the following amino acid analysis: Lys, 2.2; Asp, 1.0; Ser, 0.98; Cys, 1.1; Thr, 2.0; Gyl, 1.0; Phe, 3.5.

The title compound is obtained also by following the procedure of this example but replacing the title compound of Example 23b with an equivalent amount of the title compound of Example 23c. In this case methanolbenzene (4:1) is a suitable reaction solvent.

In the same manner the linear tetradecapeptide of Examples 23b and 23c are converted to the title compound by the method of Hiskey and Smith cited above.

EXAMPLE 25

Somatostatin, Cyclic Disulfide of
Alanylglycylcysteinyllysylasparaginylphenylalanyl-
phenylalanyltryptophyllysylthreonylphenylalanyl-
threonylserylcysteine (H—Ala—Gly—Cys—Lys—Asn—Phe
                |
Phe—Trp—Lys—Thr—Phe—Thr—Ser—Cys—OH)

A solution of the title cyclic disulfide of Example 24, (0.368 g, 0.19 mmole) in conc. HCl (16.4 ml) is stirred under an atomsphere of nitrogen for 8 minutes at 0°C. Glacial acetic acid (164 ml) is added and the solution is freeze-dried. The residue is dissolved in water (60 ml) and again freeze-dried. The residue is dissolved in water (50 ml), applied to a column of carboxymethyl cellulose (Whatman CM-23) (2x20 cm) and eluted with 0.100 M ammonium acetate buffer. The purified material (0.065 g) is lyophilized from water to give the product as a white solid, in the form of its acetic acid addition salt, λmax MeOH 274 nm (ε 5,730), 281 nm (6,060), 289 nm (5,410); amino acid analysis: Lys, 2.24; Thr, 2.31; Ser, 1.0; Gly, 1.0; Asp, 0.95; Ala, 0.95; Cys, 1.11; Phe, 3.17; AcOH=3.09 equivalents. Lyophilization of the latter compound from dilute hydrochloric acid gives the corresponding hydrochloric acid addition salt, Lys, 2.16; Thr, 2.09; Ser, 0.96; Gly, 1.0; Asp, 1.05; Ala, 1.0; Ser, 1.06; Cys, 0.81; Phe, 2.9.

The title compound, somatostatin, is obtained also by following the procedure of this example but replacing the title cyclic disulfide of Example 24 with an equivalent amount of the title cyclic disulfide of Example 24a.

EXAMPLE 26

Alanylglycylcysteinyllysylasparaginylphenylalanyl-
phenylalanyltryptophyllysylthreonylphenylalanyl-
serylcysteine (H-Ala-Gly-Cys-Lys-Asn-Phe-Phe-Trp-Lys-Thr-
Phe-Thr-Ser-Cys-OH)

By following the procedure of Example 25 but replacing the title cyclic disulfide of Example 24 with an equivalent amount of the title compound of Example 23a,

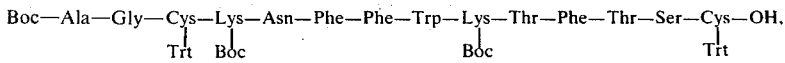

the title compound of this example is obtained; amino acid analysis: Lys, 1.83; Asp, 0.91, Thr, 2.31; Ser, 1.08; Gly, 1.0; Ala, 0.86; Cys, 0.38; Phe, 2.64.

Likewise, replacement with the title compound of Example 23c gives the title compound of this example.

We claim:

1. A process for preparing a tetradecapeptide of formula 1

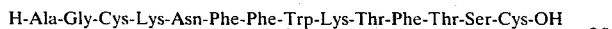

which comprises reacting a first heptapeptide of the (1) formula

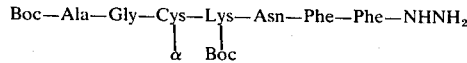

in which α is a sulfhydryl protecting group selected from the group consisting of acetamidomethyl or Trt with a second heptapeptide of the formula

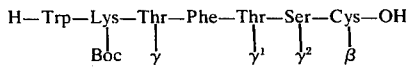

in which β is a sulfhydryl protecting group selected from the group consisting of acetamidomethyl or Trt and γ, γ¹ and γ² are either hydrogen or the hydroxy protecting group Bu⁺ with the provisos that when γ is hydrogen γ¹ and γ² are hydrogen and that when γ is Bu⁺ γ¹ and γ² are Bu⁺, in the presence of an organic nitrite and a mineral acid according to the azide coupling method to obtain the linear tetradecapeptide of formula

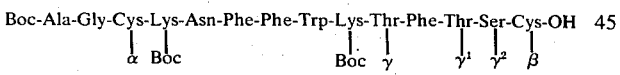

in which α, β, γ, γ¹ and γ² are as defined herein; followed by subjecting said linear tetradecapeptide to treatment with iodine or thiocyanogen to obtain the corresponding cyclic disulfide derivative and subsequently treating said cyclic disulfide derivative in the presence of a concentrated organic acid or an aqueous solution of a mineral acid under moderately acidic conditions appropriate to remove the acetamidomethyl, Trt, Bu⁺ or Boc protecting groups to obtain the desired tetradecapeptide of formula 1; or followed by subjecting said linear tetradecapeptide to treatment with either mercuric acetate, mercuric chloride, silver acetate or silver nitrate or remove selectively the sulfhydryl protecting groups to obtain the mercuric or disilver salt, respectively, of the corresponding disulfhydryl derivative; converting the latter salt to its corresponding free disulfhydryl derivative by treatment with hydrogen sulfide, oxidizing said last-named derivative by treatment with oxygen, 1,2-diiodoethane, sodium or potassium ferricyanide or iodine to obtain the corresponding cyclic disulfide derivative and treating said cyclic disulfide derivative in the presence of a concentrated organic acid or an aqueous solution of a mineral acid under moderately acidic conditions appropriate to remove the acetamidomethyl, Trt, Bu⁺ or Boc protecting groups to obtain the desired tetradecapeptide of formula 1.

2. A process as claimed in claim 1 in which the first heptapeptide is prepared by reacting Boc-Ala-Gly-OR wherein R is 2, 4, 5-trichlorophenyl, pentachlorophenyl, p-nitrophenyl, succinimido and 1-benzotriazolyl with

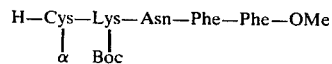

in which α is as defined therein, to obtain

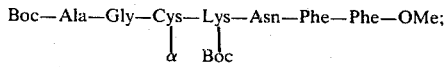

in which α is as defined therein followed by reacting said last named compound with hydrazine hydrate and isolating said first heptapeptide.

3. A process as claimed in claim 2 in which the pentapeptide,

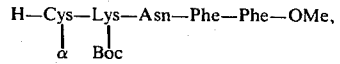

is prepared by reacting

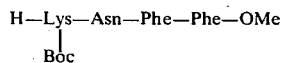

with activated ester of

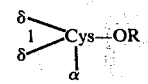

in which α is acetamidomethyl or Trt and δ is hydrogen and δ¹ is Trt and δ and δ¹ together are α-phenyl-5-chloro-2-hydroxybenzylidine and R is 2,4,5-trichlorophenyl, pentachlorophenyl, p-nitrophenyl, succinimido and 1-benzotriazolyl to obtain

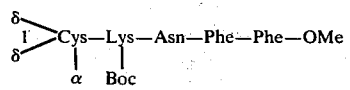

in which α, δ and δ¹ are as defined herein and thereafter removing the terminal amino protecting group (Trt or α-phenyl-5-chloro-2-hydroxybenzylidine) of said last-named compound under mildly acidic conditions in the presence of a dilute aqueous solution of an organic acid to obtain the desired pentapeptide.

4. A process as claimed in claim 3 in which the tetrapeptide,

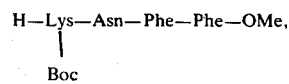

is prepared by reacting H-Asn-Phe-Phe-OMe with

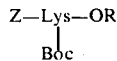

wherein R is 2, 4, 5-trichlorophenyl, pentachlorophenyl, p-nitrophenyl, succinimido and 1-benzotriazolyl to obtain

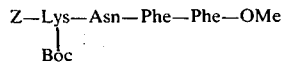

and hydrogenating the last-named compound with hydrogen and a noble metal catalyst.

5. A process as claimed in claim 4 in which the tripeptide, H-Asn-Phe-Phe-OMe, is prepared by reacting H-Phe-Phe-OMe with Boc-Asn-OR wherein R is 2, 3, 5-trichlorophenyl, pentachlorophenyl, p-nitrophenyl, succinimido and 1-benzotriazolulyl to obtain Boc-Asn-Phe-Phe-OMe and removing the terminal amino protecting group under moderately acidic conditions in the presence of a concentrated organic acid or an aqueous solution of a mineral acid to obtain the desired tripeptide.

6. A process as claimed in claim 5 in which the dipeptide, H-Phe-Phe-OMe, is prepared by reacting H-Phe-OMe with Boc-Phe-OR wherein R is 2, 4, 5-trichlorophenyl, pentachlorophenyl, p-nitrophenyl, succinimido and 1-benzotriazolyl to obtain Boc-Phe-Phe-OMe and removing the terminal protecting group under moderately acidic conditions in the presence of a concentrated organic acid or an aqueous solution of a mineral acid to obtain the desired dipeptide.

7. A process as claimed in claim 2 in which Boc-Ala-Gly-OR is prepared by reacting H-Gly-OMe with Boc-Ala-OR wherein R is 2, 4, 5-trichlorophenyl, pentachlorophenyl, p-nitrophenyl, succinimido and 1-benzotriazolyl to obtain Boc-Ala-Gly-OMe, subjecting said last-named compound to hydrolyzing conditions with a base to obtain Boc-Ala-Gly-OH and converting said last-named compound to a corresponding desired ester.

8. A process as claimed in claim 1 in which the second heptapeptide is prepared by reacting α, α-dimethyl-3,5-dimethoxybenzyloxy carbonyl

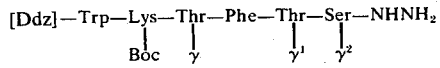

in which γ, γ¹ and γ² are as defined therein with

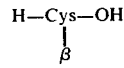

in which β is acetamidomethyl or Trt in the presence of an organic nitrite and a mineral acid according to the azide coupling method to obtain the corresponding heptapeptide, α, α-dimethyl-3,5-dimethoxybenzyloxy carbonyl

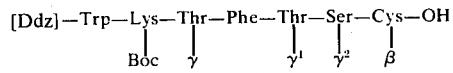

and removing the terminal amino protecting group α,α-dimethyl-3,5-dimethoxybenzyloxy carbonyl of said last-named compound under mildly acidic conditions in the presence of a dilute aqueous solution of an organic acid to obtain said second heptapeptide.

9. A process as claimed in claim 8 in which the hexapeptide, α,α-dimethyl-3,5-dimethoxybenzyloxy carbonyl

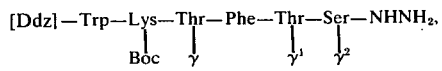

is prepared by reacting

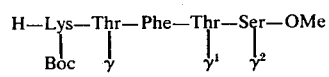

in which γ, γ¹ and γ² are as defined therein with α, α-dimethyl-3,5-dimethoxybenzyloxy carbonyl-Trp-OR to obtain α, α-dimethyl-3,5-dimethoxybenzyloxy carbonyl

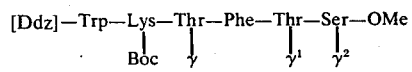

in which γ, γ¹, γ² are as defined therein and wherein R is 2,4,5-trichlorophenyl, pentachlorophenyl, p-nitrophenyl, succinimido and 1-benzotriazolyl, followed by reacting the last-named compound with hydrazine hydrate and isolating said hexapeptide.

10. A process as claimed in claim 9 in which the pentapeptide

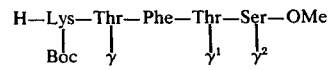

is prepared by reacting

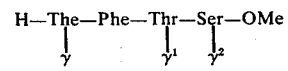

in which γ, γ¹ and γ² are as defined therein with

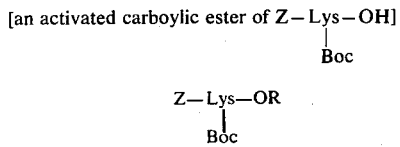

to obtain

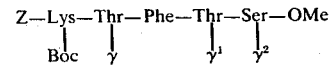

in which γ, γ¹ γ² and R are as defined therein and removing the terminal amino protecting group (Z) of said last-named compound by hydrogenation in the presence of a noble metal catalyst.

11. A process as claimed in claim 10 in which the tetrapeptide

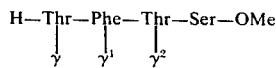

is prepared by reacting the tripeptide of formula

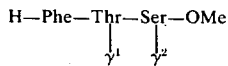

in which $\gamma^1$ and $\gamma^2$ both represent a hydrogen or both represent Bu⁺ with

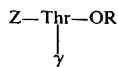

in which $\gamma$ is hydrogen when $\gamma^1$ and $\gamma^2$ of the aforementioned tripeptide are both hydrogen or $\gamma$ is Bu⁺ when $\gamma^1$ and $\gamma^2$ of the aforementioned tripeptide are both Bu⁺ to obtain

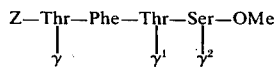

in which $\gamma$, $\gamma^1$, $\gamma^2$ and R are as defined therein and removing the terminal amino protecting group (Z) of said last-named compound by hydrogenation in the presence of a noble metal catalyst.

12. A process as claimed in claim 11 in which the tripeptide,

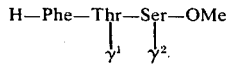

is prepared by reacting

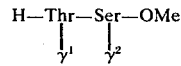

in which $\gamma^1$ and $\gamma^2$ both represent hydrogen or both represent Bu⁺ with Z-Phe-OR to obtain the corresponding compound of formula

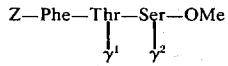

in which $\gamma^1$, $\gamma^2$ and R are as defined herein and removing the terminal amino protecting group (Z) of said last-named compound by hydrogenation in the presence of a noble metal catalyst.

13. A process as claimed in claim 12 in which the depeptide,

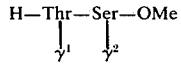

is prepared by reacting the serine derivative of formula

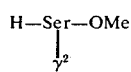

in which $\gamma^2$ is hydrogen or Bu⁺ with

[an activated carboylic ester of Z—Thr—OH]
|
$\gamma'$

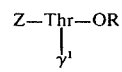

in which $\gamma^1$ is hydrogen when $\gamma^2$ of the aforementioned serine derivative is hydrogen and $\gamma^1$ is Bu⁺ when $\gamma^2$ of the aforementioned serine derivative is Bu⁺ and R is as defined therein to obtain the corresponding compound of formula

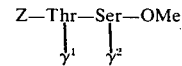

and removing the terminal amino protecting group (Z) of said last-named compound by hydrogenation in the presence of a noble metal catalyst.

14. A process as claimed in claim 1 in which the linear tetradecapeptide as defined therein is subjected to moderately acidic conditions in the presence of a concentrated organic acid or an aqueous solution of a mineral acid to obtain the compound of formula H-Ala-Gly-Cys-Lys-Asn-Phe-Phe-Trp-Lys-Thr-Phe-Thr-Ser-Cys-OH.

15. A process as claimed in claim 1 in which the corresponding disulfhydryl derivative as defined therein is subjected to moderately acidic conditions in the presence of a concentrated organic acid or an aqueous solution of a mineral acid to obtain the compound of formula H-Ala-Gly-Cys-Lys-Asn-Phe-Phe-Trp-Lys-Thr-Phe-Thr-Ser-Cys-OH.

16. The process as claimed in claim 1 wherein said linear tetradecapeptide is subjected to treatment with iodine in the presence of a lower alkanol to obtain the corresponding cyclic disulfide derivative.

17. The process as claimed in claim 1 wherein said linear tetradecapeptide is subjected to treatment with iodine at from about 0° to 30°C for about 30 to 180 minutes in a lower alkanol to obtain the corresponding cyclic disulfide derivative.

18. A compound of the formula

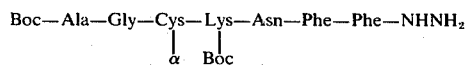

in which $\alpha$ is acetamidomethyl or Trt.

19. A compound of the formula

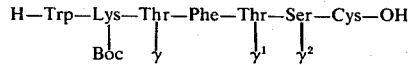

in which $\beta$ is acetamidomethyl or Trt and $\gamma$, $\gamma^1$ and $\gamma^2$ are all hydrogen or all Bu⁺.

20. A compound of the formula

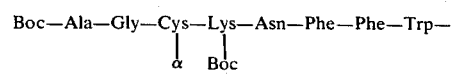

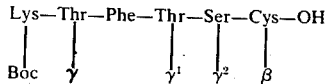

in which $\alpha$ and $\beta$ are both acetamidomethyl or Trt and $\gamma$, $\gamma^1$ and $\gamma^2$ are all hydrogen or all Bu⁺.

21. A compound of the formula

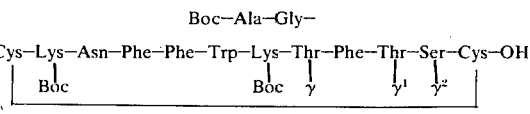

in which $\gamma$, $\gamma^1$ and $\gamma^2$ are all hydrogen or all Bu⁺.

* * * * *